(12) United States Patent
Kimura et al.

(10) Patent No.: US 7,239,456 B2
(45) Date of Patent: Jul. 3, 2007

(54) SUPER WIDE-ANGLE LENS SYSTEM AND IMAGE-CAPTURING DEVICE USING THE SAME

(75) Inventors: Yoko Kimura, Ayase (JP); Atsushi Shibayama, Tokyo (JP); Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 8 days.

(21) Appl. No.: 11/092,919

(22) Filed: Mar. 30, 2005

(65) Prior Publication Data

US 2005/0219715 A1    Oct. 6, 2005

(30) Foreign Application Priority Data

| Mar. 31, 2004 | (JP) | ............................. 2004-105342 |
| Mar. 31, 2004 | (JP) | ............................. 2004-105415 |
| Feb. 15, 2005 | (JP) | ............................. 2005-038308 |

(51) Int. Cl.
*G02B 13/04* (2006.01)
(52) U.S. Cl. ...................... 359/749; 359/740
(58) Field of Classification Search ........ 359/749–753, 359/740
See application file for complete search history.

(56) References Cited

U.S. PATENT DOCUMENTS 4,598,980 A *   7/1986   Doi et al. .................. 359/735
5,530,591 A *   6/1996   Tachihara et al. ............ 359/661
6,441,967 B2 *  8/2002   Furuta ......................... 359/684
6,621,645 B2    9/2003   Sato
7,027,231 B2 *  4/2006   Miyano ....................... 359/661

FOREIGN PATENT DOCUMENTS

| JP | 57-064716 A | 4/1982 |
| JP | 57-158609 A | 9/1982 |
| JP | 4-50910 A   | 2/1992 |
| JP | 5-34592     | 2/1993 |
| JP | 05-034592 A | 2/1993 |
| JP | 2001-159732 | 6/2001 |
| JP | 2001-159732 A | 6/2001 |

* cited by examiner

*Primary Examiner*—Jordan M. Schwartz
(74) *Attorney, Agent, or Firm*—Miles & Stockbridge P.C.

(57) ABSTRACT

In order to provide a fast super wide-angle lens system having the f-number of f/2.8 and a wide angle of view of 2ω=100° or more in an imaging area of a digital camera and an image-capturing device equipped with the super wide-angle lens system. The lens system includes, in order from an object, a first lens group G1 having negative refractive power, an aperture stop S, and a second lens group G2 having positive refractive power, and the lens system satisfies predetermined conditional expressions.

13 Claims, 17 Drawing Sheets

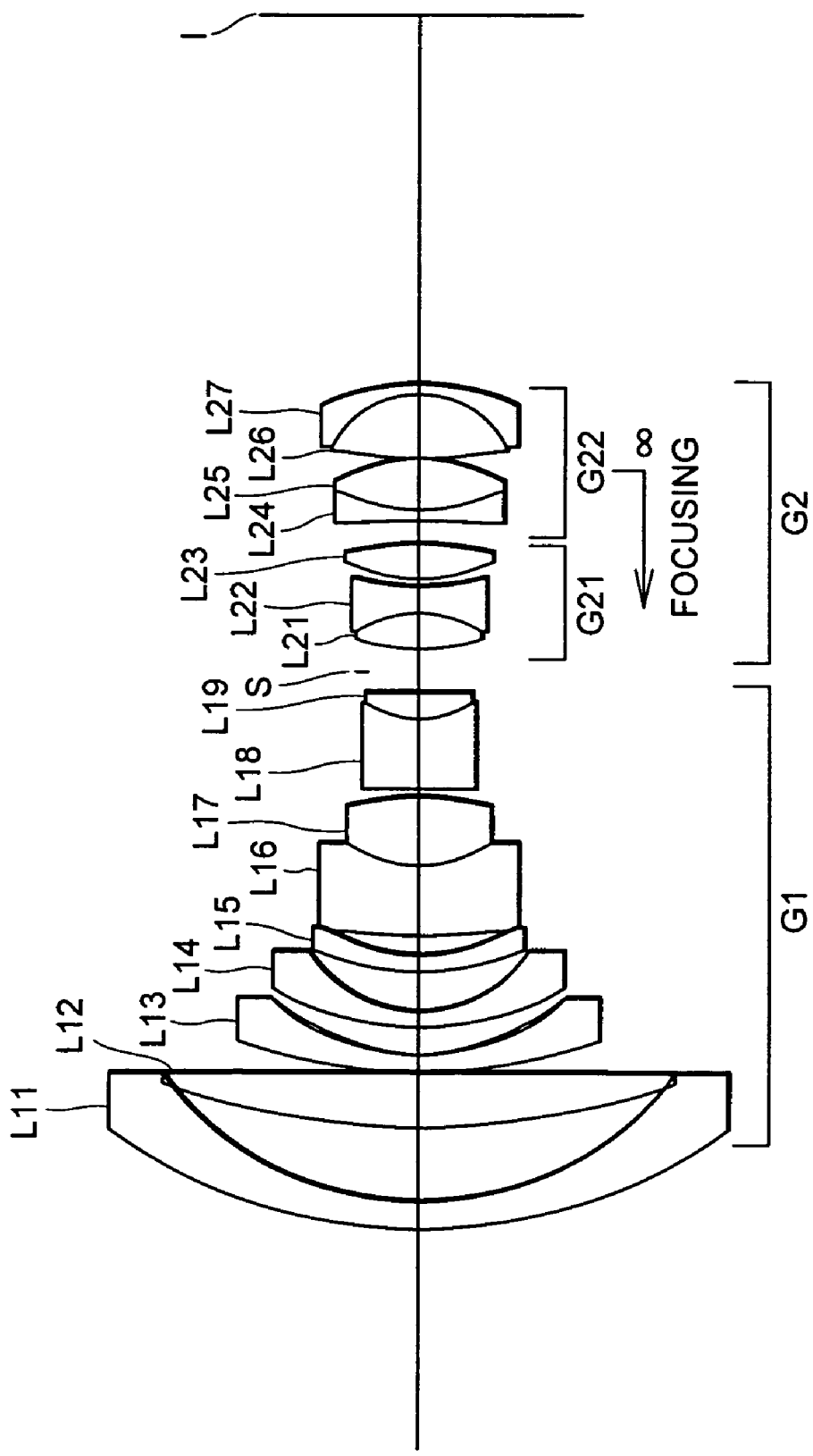

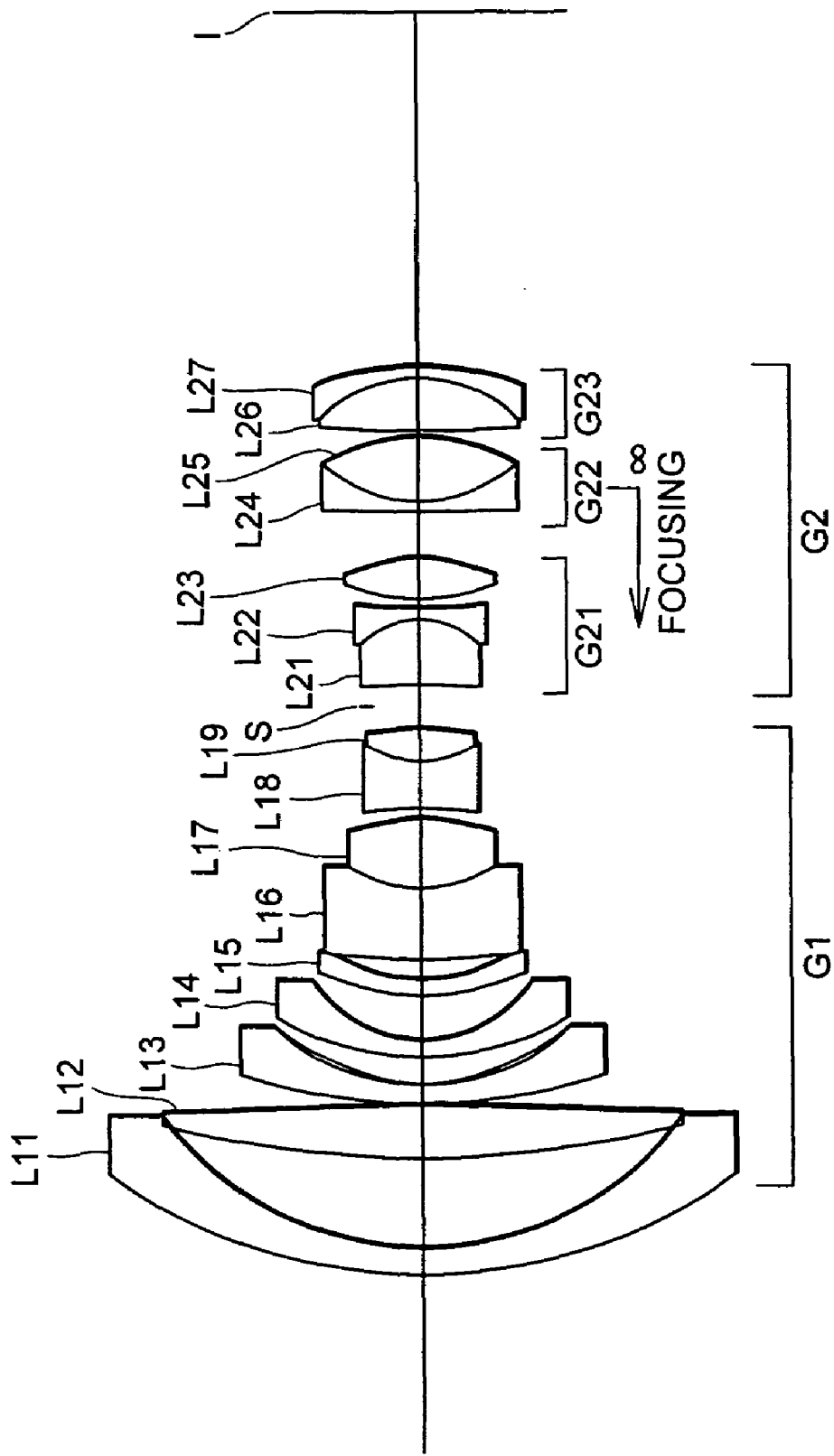

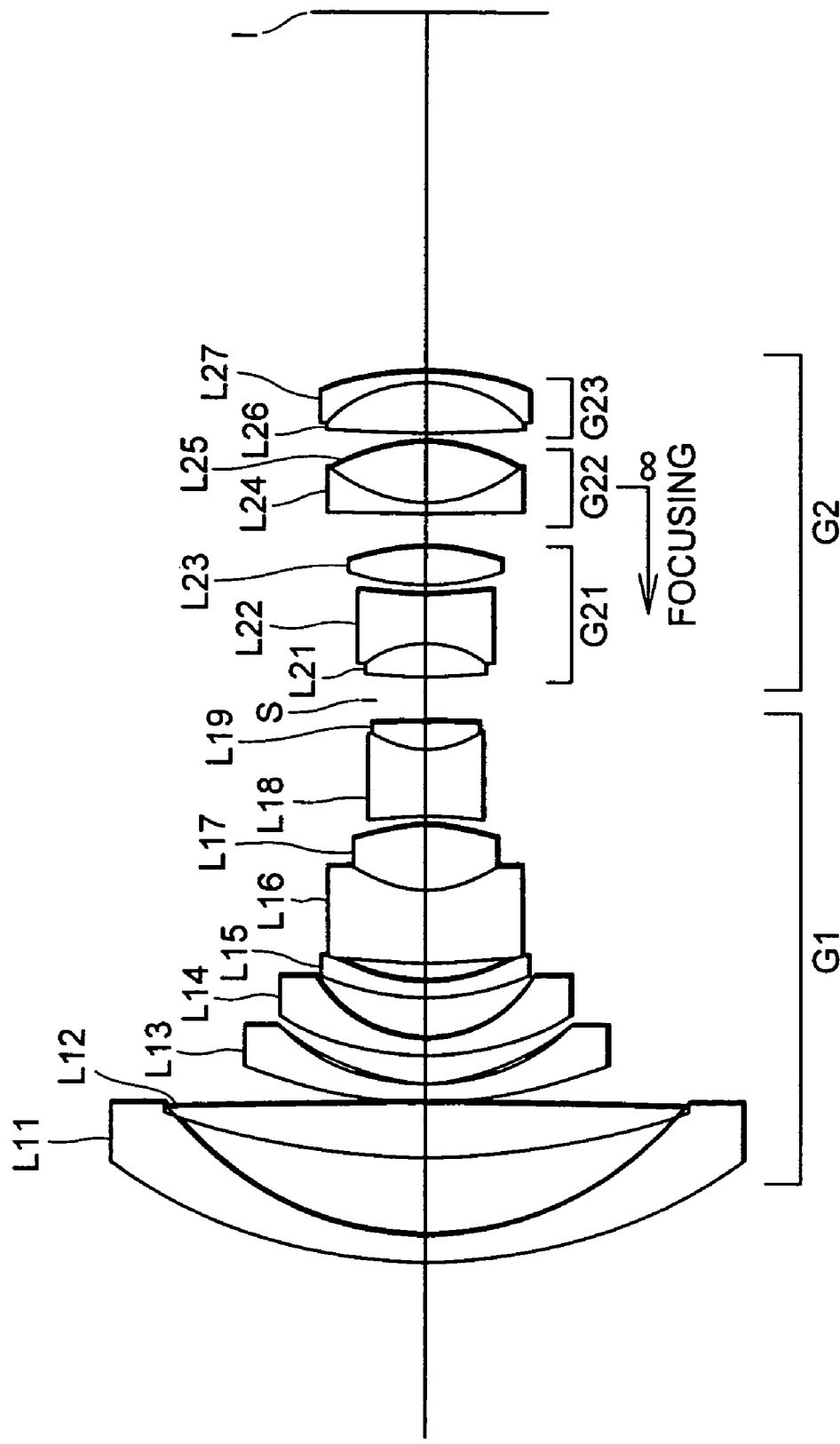

SUPER WIDE-ANGLE LENS SYSTEM AND IMAGE-CAPTURING DEVICE USING THE SAME

The disclosure of the following priority applications are herein incorporated by reference:

Japanese Patent Application No. 2004-105342 filed on Mar. 31, 2004,

Japanese Patent Application No. 2004-105415 filed on Mar. 31, 2004, and

Japanese Patent Application No. 2005-038308 filed on Feb. 15, 2005.

BACKGROUND OF THE INVENTION

1. Field of the Invention

The present invention relates to a super wide-angle lens system and in particular to a fast super wide-angle lens system having a wide angle of view suitable for a single-lens-reflex camera using silver-halide film or a solid-state imaging device. The present invention relates also to an image-capturing device equipped with the super wide-angle lens system.

2. Related Background Art

Up to now, not many proposals regarding a super wide-angle lens system having an angle of view of $2\omega=100°$ or more with ordinary projection method ($y=f\cdot\tan\theta$) have been made. Furthermore, proposals of a fast super wide-angle lens system with the f-number of about f/2.8 have been extremely rare. Super wide-angle lens systems like this have been proposed by the applicant of the present invention in Japanese Patent Application Laid-Open Nos. 5-34592 and 2001-159732.

However, super wide-angle lens systems disclosed by the above-mentioned patent documents correspond to an imaging area of a silver-halide film camera and not that of a digital camera. Accordingly, in order to construct a super wide-angle lens system with an angle of view of $2\omega=100°$ or more in an imaging area of a digital camera, since the focal length becomes short, it becomes difficult to secure back focal length.

Moreover, in a super wide-angle lens systems proposed in Japanese Patent Application Laid-Open No. 5-34592, the ratios of the back focal length to the focal length are from 2.73 to 2.75. Accordingly, when a shorter focal length is to obtain with the super wide-angle lens system, it may produce a problem to interfere with a quick return mirror of an SLR camera.

SUMMARY OF THE INVENTION

The present invention is made in view of the aforementioned problems and has an object to provide a fast super wide-angle lens system having the f-number of f/2.8 and a wide angle of view of $2\omega=100°$ or more in an imaging area of a digital camera suitable for a single-lens-reflex camera using silver-halide film or a solid-state imaging device with a back focal length of 3.5 times or more of the focal length with superb optical performance. The present invention has also an object to provide an image-capturing device equipped with the super wide-angle lens system.

According to one aspect of the present invention, a super wide-angle lens system with an angle of view of 100° or more includes, in order from an object, a first lens group having negative refractive power, an aperture stop, and a second lens group having positive refractive power. The following conditional expression (1) is satisfied:

$$-5.0 < f1/f < -0.5 \tag{1}$$

where f denotes the focal length of the super wide-angle lens system, and f1 denotes the focal length of the first lens group.

In one preferred embodiment of the present invention, the second lens group includes, in order from the object, a front lens group and a rear lens group, and the following conditional expression (2) is preferably satisfied:

$$0.2 < f2/fr \leq 1.0 \tag{2}$$

where f2 denotes the focal length of the second lens group, and fr denotes the focal length of the rear lens group.

In one preferred embodiment of the present invention, the following conditional expression (3) is preferably satisfied:

$$0.04 < f/TL < 0.12 \tag{3}$$

where f denotes the focal length of the super wide-angle lens system, and TL denotes the distance along the optical axis between the most object side lens surface and the image plane of the super wide-angle lens system.

In one preferred embodiment of the present invention, the first lens group includes at least one aspherical lens having negative refractive power and the following conditional expression (4) is preferably satisfied:

$$0.0 < [(dm-d0)/hm]/[(d30-d0)/h30] < 3.0 \tag{4}$$

where d0 denotes the thickness of the aspherical lens along the optical axis (center thickness), dm denotes the thickness of the aspherical lens parallel to the optical axis at the height of the maximum effective aperture on the image side surface, d30 denotes the thickness of the aspherical lens parallel to the optical axis at the height of 30% of the maximum effective aperture on the image side surface, hm denotes the maximum effective radius of the aspherical lens on the image side surface, and h30 denotes the 30% of the maximum effective radius of the aspherical lens on the image side surface.

According to another aspect of the present invention, a super wide-angle lens system includes, in order from an object, a first lens group having negative refractive power, an aperture stop, and a second lens group having positive refractive power. The first lens group includes at least one aspherical lens having negative refractive power, and the following conditional expressions (1) and (4) are satisfied:

$$-5.0 < f1/f < -0.5 \tag{1}$$

$$0.0 < [(dm-d0)/hm]/[(d30-d0)/h30] < 3.0 \tag{4}$$

where f denotes the focal length of the super wide-angle lens system, f1 denotes the focal length of the first lens group, d0 denotes the thickness of the aspherical lens along the optical axis (center thickness), dm denotes the thickness of the aspherical lens parallel to the optical axis at the height of the maximum effective aperture on the image side surface, d30 denotes the thickness of the aspherical lens parallel to the optical axis at the height of 30% of the maximum effective aperture on the image side surface, hm denotes the maximum effective radius of the aspherical lens on the image side surface, and h30 denotes the 30% of the maximum effective radius of the aspherical lens on the image side surface.

In one preferred embodiment of the present invention, the first lens group includes, in order from the object, a first negative lens, a second negative lens, and a third negative lens.

The present invention provides an image-capturing device using the super wide-angle lens system.

According to another aspect of the present invention, a super wide-angle lens system includes, in order from an object, a first lens group having negative refractive power, an aperture stop, a second lens group having positive refractive power. The first lens group includes, in order from the object, a first negative meniscus lens having a convex surface facing to the object, a positive lens having a convex surface facing to the object, and a second negative meniscus lens having a convex surface facing to the object. The second negative meniscus lens is an aspherical lens. The super wide-angle lens system has the back focal length of 3.5 times or more longer than the focal length.

In one preferred embodiment of the present invention, the following conditional expressions (5) and (6) are satisfied:

$$-1.80 < f1/f < -0.50 \quad (5)$$

$$2.00 < f2/f < 3.60 \quad (6)$$

where f denotes the focal length of the super wide-angle lens system, f1 denotes the focal length of the first lens group, and f2 denotes the focal length of the second lens group.

In one preferred embodiment of the present invention, the following conditional expressions (7), (8), and (9) are preferably satisfied:

$$4.5 < R1/f < 9.0 \quad (7)$$

$$3.0 < R2/f < 4.5 \quad (8)$$

$$6.0 < R3/f < 15.0 \quad (9)$$

where R1 denotes the radius of curvature of the object side surface of the first negative meniscus lens, R2 denotes the radius of curvature of the image side surface of the first negative meniscus lens, and R3 denotes the radius of curvature of the object side surface of the positive lens in the first lens group.

In one preferred embodiment of the present invention, the first lens group includes at least three lens elements to the image side of the second negative meniscus lens and the following conditional expression (10) is preferably satisfied:

$$2.0 < \Sigma D/f < 4.0 \quad (10)$$

where $\Sigma D$ denotes the summation of the thicknesses of lens elements along the optical axis locating to the image side of the second negative meniscus lens in the first lens group.

In one preferred embodiment of the present invention, the image side surface of the second negative meniscus lens is an aspherical surface with negative refractive power getting weaker on the periphery than the central portion.

In one preferred embodiment of the present invention, the second lens group has at least one positive lens and the following conditional expression (11) is preferably satisfied:

$$75 < \nu P \quad (11)$$

where $\nu P$ denotes Abbe number of the glass material of the positive lens in the second lens group at d-line ($\lambda$=587.6 nm).

In one preferred embodiment of the present invention, the second lens group is composed of, in order from the object, a 2-1 lens group having positive refractive power, and a 2-2 lens group having positive refractive power, focusing from infinity to a close-range object is carried out by moving only the 2-2 lens group to the object side, and the following conditional expressions (12) and (13) are preferably satisfied:

$$0.4 < f21/f22 < 0.8 \quad (12)$$

$$0.1 < M22 < 0.4 \quad (13)$$

where f21 denotes the focal length of the 2-1 lens group, f22 denotes the focal length of the 2-2 lens group, and M22 denotes the imaging magnification of the 2-2 lens group.

In one preferred embodiment of the present invention, the second lens group is composed of, in order from the object, a 2-1 lens group having positive refractive power, a 2-2 lens group having positive refractive power, and a 2-3 lens group having positive refractive power, focusing from infinity to a close-range object is carried out by moving only the second lens group to the object, and the following conditional expressions (14) and (15) are preferably satisfied:

$$0.5 < f22/f23 < 1.2 \quad (14)$$

$$0.3 < M22 < 0.9 \quad (15)$$

where f22 denotes the focal length of the 2-2 lens group, f23 denotes the focal length of the 2-3 lens group, and M22 denotes the imaging magnification of the 2-2 lens group.

In one preferred embodiment of the present invention, the second lens group is composed of, in order from the object, a 2-1 lens group having positive refractive power, a 2-2 lens group, and a 2-3 lens group having positive refractive power, focusing from infinity to a close-range object is carried out by moving the 2-2 lens group and the 2-3 lens group with different speeds, and the following conditional expression (16) is preferably satisfied:

$$0 < A < 1 \quad (16)$$

where A denotes a ratio of the moving amount of the 2-3 lens group to that of the 2-2 lens group upon focusing.

According to another aspect of the present invention, a super wide-angle lens system includes, in order from an object, a first lens group having negative refractive power, an aperture stop, a second lens group having positive refractive power. The first lens group includes, in order from the object, a first negative meniscus lens having a convex surface facing to the object, a positive lens having a convex surface facing to the object, a second negative meniscus lens having a convex surface facing to the object, and at least three lens elements. The second negative meniscus lens is an aspherical lens. The super wide-angle lens system has the back focal length of 3.5 times or more longer than the focal length, and the following conditional expression (10) is satisfied:

$$2.0 < \Sigma D/f < 4.0 \quad (10)$$

where $\Sigma D$ denotes the summation of the thicknesses of lens elements along the optical axis locating to the image side of the second negative meniscus lens in the first lens group.

Other features and advantages according to the present invention will be readily under stood from the detailed description of the preferred embodiments in conjunction with the accompanying drawings.

BRIEF DESCRIPTION OF THE DRAWINGS

FIG. 8 is a diagram showing a sectional view of a super wide-angle lens system according to Example 4 of a second embodiment of the present invention together with a trajectory of a focusing lens group.

FIG. 10 is a diagram showing a sectional view of a super wide-angle lens system according to Example 5 of the second embodiment of the present invention together with a trajectory of a focusing lens group.

FIG. 12 is a diagram showing a sectional view of a super wide-angle lens system according to Example 6 of the second embodiment of the present invention together with a trajectory of a focusing lens group.

DESCRIPTION OF THE PREFERRED EMBODIMENTS

First Embodiment

Figure 1:
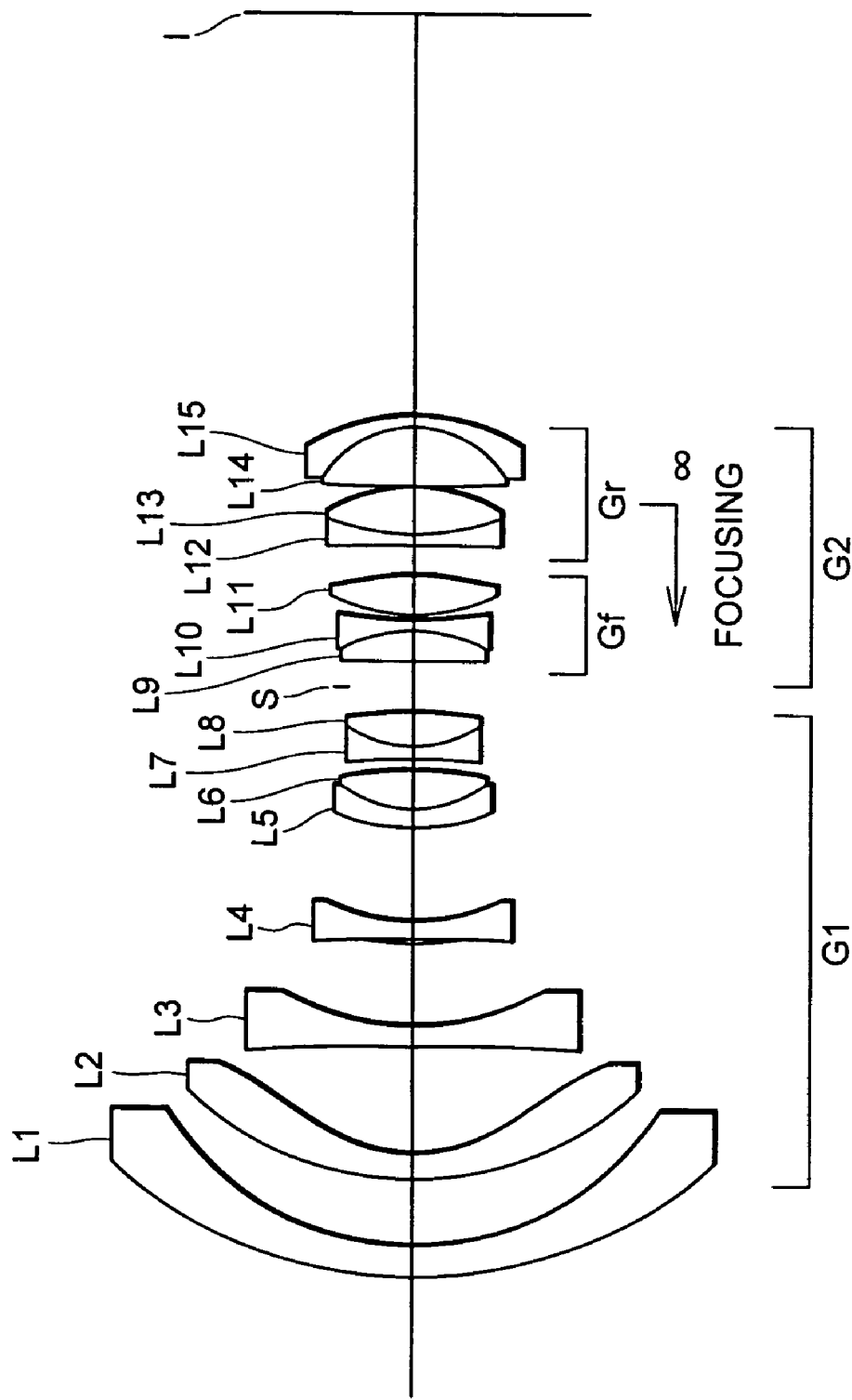
FIG. 1 is a diagram showing a sectional view of a super wide-angle lens system according to Example 1 of a first embodiment of the present invention together with a trajectory of a focusing lens group.

On designing an objective optical system including a photographic lens the most difficult hurdle is to obtain both extremely large angle of view and high-speed aperture ratio. This means nothing else but to correct Seidel's aberrations thoroughly. Because of this difficulty it has been rare to propose an optical system having an f-number of f/2.8 and an angle of view of $2\omega=100°$ or more, which is close to the limit with ordinary projection method within the shooting area of a silver-halide film camera.

The present invention makes it possible to realize a super wide-angle lens system having a high-speed aperture ratio and an extremely wide angle of view within a shooting area of a digital camera, which are epoch-making specifications. Moreover, the present invention makes it possible to realize a super wide-angle lens system being sufficiently compact to use regularly, securing sufficient peripheral quantity of light, having high optical performance, and being constructed by an aspherical lens capable of being produced with current mass production technology. In consideration of productivity, it is preferable that the aspherical lens can be produced by a glass mold method having high productivity not by a precision grinding method having fewer productivity. Accordingly, large amount of cost down can be expected, so that even an end-user can enjoy cost performance.

At first the basic construction of a super wide-angle lens system according to the present invention is explained. The super wide-angle lens system according to the present invention is a so-called retrofocus type lens constructed basically by a divergent lens group (a first lens group) having negative refractive power and a convergent lens group (a second lens group) having positive refractive power.

The divergent lens group is composed of, in order from an object, a negative meniscus lens, several negative lenses and positive lenses. The divergent lens group preferably has a thick cemented lens to satisfactorily correct on-axis aberrations and off-axis aberrations. As described below with the explanation of conditional expressions, a specific aspherical lens can excellently correct aberrations mainly off-axis ones.

The convergent lens group has a function of a master lens of the whole lens system and has lens groups including negative-positive-negative power arrangement. Upon focusing at a close-range object, the focusing is carried out by moving the whole convergent lens group or a portion of the convergent lens group. Moreover, the lens group being moved for focusing preferably has at least a positive-negative-positive power arrangement. Furthermore, the convergent lens group preferably has a plurality of cemented lenses to suitably set Petzval sum and satisfactorily correct spherical aberration and lateral chromatic aberration.

The above-described high speed super wide-angle lens system according to the present invention having epoch-making specifications is realized by developing an aspherical lens capable of being easily fabricated and having suitable correction effect. In the super wide-angle lens system according to the present invention, an aspherical surface is introduced on the object side lens surface having greater correction effect on off-axis aberrations. Accordingly, the off-axis ray height $\bar{h}$ from the optical axis corresponding to each image height sufficiently separates with each other and bundle of ray corresponding to each image height is narrow. Therefore, aberration correction can be carried out independently with each bundle of ray corresponding to each image height by remarkably controlling high-order term only.

As described above, by effectively using high-order terms of aspherical coefficients, aberrations corresponding to the marginal ray, which has been unable to be satisfactorily corrected, can be corrected well. Accordingly, suitable setting of high-order terms effectively improves peripheral optical performance and distortion, lower coma, and astigmatism on the extreme periphery can be secured satisfactory.

Accordingly, satisfactory aberration correction can be carried out by setting an aspherical surface to an optimum position in consideration of the heights h and $\bar{h}$ from the optical axis and by controlling above-mentioned aspherical coefficients. In lens design, it may often happen that even if lens design is possible manufacturing the lens is difficult. However, in the super wide-angle lens system according to the present invention, an aspherical lens is set at optimum position and aspherical coefficients are skillfully controlled to adjust the aspherical shape, so that the aspherical surface formed on a concave surface can be fabricated by a glass mold method, which has been difficult even by a fine grinding method or a glass mold method. Accordingly, optical performance is improved and the number of lens elements in particular positive lens elements in the divergent lens group can be reduced resulting in accomplishing compactness.

Conditional expressions of the super wide-angle lens system according to the present invention are explained.

A super wide-angle lens system with an angle of view of 100° or more includes, in order from an object, a first lens group having negative refractive power, an aperture stop, and a second lens group having positive refractive power. The following conditional expression (1) is satisfied:

$$-5 < f1/f < -0.5 \qquad (1)$$

where f denotes the focal length of the super wide-angle lens system, f1 denotes the focal length of the first lens group.

In the super wide-angle lens system according to the present invention, the second lens group has, in order from the object, a front lens group and a rear lens group, and the following conditional expression (2) is preferably satisfied:

$$0.2 < f2/fr < 1.0 \qquad (2)$$

where f2 denotes the focal length of the second lens group, and fr denotes the focal length of the rear lens group.

In the super wide-angle lens system according to the present invention, the following conditional expression (3) is preferably satisfied:

$$0.04 < f/TL < 0.12 \qquad (3)$$

where f denotes the focal length of the super wide-angle lens system, and TL denotes a distance along the optical axis from the most object side lens surface to an image plane of the super wide-angle lens system.

In the super wide-angle lens system according to the present invention, the first lens group preferably has at least one aspherical lens having negative refractive power.

In the super wide-angle lens system according to the present invention, the following conditional expression (4) is preferably satisfied:

$$0.0 < [(dm-d0)/hm]/[(d30-d0)/h30] < 3.0 \qquad (4)$$

where d0 denotes the thickness of the aspherical lens along the optical axis (center thickness), dm denotes the thickness of the aspherical lens parallel to the optical axis at the height of the maximum effective aperture on the image side surface, d30 denotes the thickness of the aspherical lens parallel to the optical axis at the height of 30% of the maximum effective aperture on the image side surface, hm denotes the maximum effective radius of the aspherical lens on the image side surface, and h30 denotes the 30% of the maximum effective radius of the aspherical lens on the image side surface.

Conditional expression (1) defines an appropriate range of power arrangement of the lens system. When the ratio f1/f is equal to or falls blow the lower limit of conditional expression (1), the back focal length becomes short, so that the required working distance cannot be secured. On the other hand, when the ratio f1/f is equal to or exceeds the upper limit of conditional expression (1), curvature of field and astigmatism in particular produces degrading optical performance, so that it is undesirable.

In order to secure better effect of the present invention, it is preferable to set the lower limit of conditional expression (1) to −3.3 and the upper limit of conditional expression (1) to −0.6.

Conditional expression (2) is for optimum rear focusing with the rear lens group of the second lens group. When the ratio f2/fr is equal to or falls below the lower limit of conditional expression (2), power of the focusing lens group becomes weak causing increase in moving amount of the focusing lens group, so that it becomes difficult to shorter the minimum focusing distance. On the other hand, when the ratio f2/fr exceeds the upper limit of conditional expression (2), power of the focusing lens group becomes excessively large causing increase in close-range aberration fluctuation, so that it is undesirable.

In order to secure better effect of the present invention, it is preferable to set the upper limit of conditional expression (2) to 0.8 and the lower limit of conditional expression (2) to 0.4.

Conditional expression (3) is to determine the dimension of the lens system. When the ratio f/TL is equal to or exceeds the upper limit of conditional expression (3), various aberrations become large, so that optical performance becomes worse. On the other hand, when the ratio f/TL is equal to or falls below the lower limit of conditional expression (3), the lens system cannot be compact.

In order to secure better effect of the present invention, it is preferable to set the upper limit of conditional expression (3) to 0.10 and the lower limit of conditional expression (3) to 0.05.

Conditional expression (4) is for suitably setting the shape of the aspherical lens having negative refractive power in the first lens group and is also for increasing optical performance and productivity controlling various parameter and aspherical coefficients. Conditional expression (4) shows variation in pseudo inclination of the aspherical surface in central portion and on the periphery and variation in the thickness of the lens element by the ratio of the thickness of the aspherical lens at the maximum height where the off-axis ray passes relative to the thickness at height of 30% of the effective aperture. In the aspherical surface, it is important that higher order terms and conical coefficient κ are dominantly controlled in the portion where the maximum off-axis ray passes, and conical coefficient κ and lower order terms are controlled in the portion of 30% height of the effective aperture. As described above, in correction of aberration, spherical aberration, lower coma of lower angle of view, and distortion can be corrected well in the vicinity of 30% height of the effective aperture, and distortion on the periphery of the image, lower coma, and astigmatism can be corrected well in the vicinity of the maximum effective aperture.

Talking about the current problems of lens fabrication using a glass molding method, when thickness difference in a meniscus lens has more than several ten times, it becomes extremely difficult to produce in volume. In addition, when the tangent angle to the concave surface side becomes 40° or more, a surface shape with high precision cannot be molded any more. And when the tangent angle increases and the surface is approaching to a hemisphere, the glass molding method itself becomes impossible.

When the ratio [(dm−d0)/hm]/[(d30−d0)/h30] is equal to or exceeds the upper limit of conditional (4), the aspherical lens becomes excessively thick on the periphery, so that it becomes difficult to fabricate. In correction of aberration, the correction balance of the aspherical surface becomes worse locally, so that correction of distortion, astigmatism, and spherical aberration becomes worse. On the other hand, when the ratio [(dm−d0)/hm]/[(d30−d0)/h30] is equal to or falls below the lower limit of conditional expression (4), the curvature on the periphery of the aspherical lens becomes excessively weak. Accordingly, the variation in aberration on the peripheral portion becomes extremely large, so that optical performance becomes worse. In the end, the marginal ray cannot focus any more.

In order to secure better effect of the present invention, it is preferable to set the lower limit of conditional expression (4) to 0.3 and the upper limit of conditional expression (4) to 2.5.

When the aspherical lens is a cemented lens, since each lens element is fabricated separately, conditional expression is to be calculated in accordance with the composite thickness of glass and resin (d0, dm, d30, and the like).

When a plurality of aspherical lenses are there in the first lens group, it is sufficient that at least one aspherical lens satisfies conditional expression (4). It is desirable for the correction of aberration and compactness that the aspherical lens satisfying conditional expression (4) is located to the most object side among the plurality of aspherical lenses. It is further preferable for fabricating the aspherical lens as well as correction of aberration and compactness that the aspherical lens is located second or behind counted from the object side, so that even better optical performance of the present invention can be expected. In order to obtain even better optical performance of the present invention, it is desirable that in addition to the aspherical lens another aspherical surface is arranged for correcting off-axis aberrations, in particular, lower coma and spherical aberration. Furthermore, it is desirable in consideration of productivity that the aspherical lens is fabricated by the glass molding method or the compound method composed of glass and resin.

A super wide-angle lens system according to each Example of a first embodiment of the present invention is explained below with reference to accompanying drawings.

EXAMPLE 1

FIG. 1 is a diagram showing a sectional view of a super wide-angle lens system according to Example 1 of a first embodiment of the present invention together with a trajectory of a focusing lens group.

The super wide-angle lens system according to Example 1 is composed of, in order from an object, a divergent first lens group G1 having negative refractive power, an aperture stop S, and a convergent second lens group G2 having positive refractive power.

The divergent first lens group G1 is composed of, in order from the object, a negative meniscus lens L1 having a convex surface facing to the object, a negative meniscus lens L2 having a convex surface facing to the object and an aspherical surface facing to an image, a double concave negative lens L3, a double concave negative lens L4, a cemented positive lens constructed by a negative meniscus lens L5 having a convex surface facing to the object cemented by a thick double convex positive lens L6, and a cemented negative lens constructed by a double concave negative lens L7 cemented with a double convex positive lens L8. The double concave negative lens L4 is a compound lens made of glass and resin. The object side glass surface of the lens L4 is applied by resin and the object side of the resin is an aspherical surface.

The convergent second lens group G2 is composed of, in order from the object, a front lens group Gf and a rear lens group Gr. The front lens group Gf is composed of, in order from the object, a cemented negative lens constructed by a double convex positive lens L9 cemented with a double concave negative lens L10, and a double convex positive lens L11. The rear lens group Gr is a focusing lens group moving for focusing composed of, in order from the object, a cemented positive lens constructed by a double concave negative lens L12 cemented with a double convex positive lens L13 and a cemented positive lens constructed by a double convex positive lens L14 cemented with a negative meniscus lens L15 having a convex surface facing to the image.

In the super wide-angle lens system according to Example 1, focusing at a close-range object is carried out by moving only the focusing lens group Gr to the object side up to the shooting distance R=0.15 m (shooting magnification β=−0.2).

In the super wide-angle lens system according to Example 1, since focusing is carried out by the lens group locating after the aperture stop S, it is suitable for a focusing method so-called "in-lens motor" method. Moreover, since the focusing lens group Gr works as a single optical system, it can be used as a so-called "vibration reduction lens group". Furthermore, it can be used as a so-called "shift lens" by shifting only the focusing lens group in off-axis direction.

Various values associated with Example 1 are listed in Table 1. In [Specifications], f denotes the focal length, 2ω denotes the maximum value of the angle of view, and FNO denotes the f-number.

In [Lens Data], the surface number is counted in order from the object side, ri denotes the radius of curvature of the i-th lens surface Ri, di denotes the distance along the optical axis between the lens surface Ri and Ri+1, and νi and ni denote Abbe number and refractive index, respectively, of the medium between the lens surface Ri and Ri+1 at d-line (λ=587.56 nm). An asterisk "*" is added to an aspherical surface, paraxial radius of curvature is listed on the column for radius of curvature, and conical coefficient κ and respective aspherical coefficients are listed in the [Aspherical Data] section. In [Variable Distances], f denotes the focal length, β denotes the shooting magnification, D0 denotes the distance between the object and the first lens surface, R denotes the distance between the object and the image plane I, and B.f. denotes the back focal length. In [Values for Conditional Expressions], values for respective conditional expressions are shown. Refractive index of the air 1.00000 is omitted.

In [Aspherical Data], E-n denotes ×10$^{-n}$. An aspherical surface is expressed by the following expression:

$$X(y) = y^2 / \left[r \cdot \{1 + (1 - \kappa \cdot y^2 / r^2)^{1/2}\}\right] + C3 \cdot |y|^3 + C4 \cdot y^4 + C5 \cdot |y|^5 + C6 \cdot y^6 + C8 \cdot y^8 + C10 \cdot y^{10} + C12 \cdot y^{12}$$

where X(y) denotes the(sag amount) distance along the optical axis from the tangent surface at the vertex of the aspherical surface to the aspherical surface at the vertical height y from the optical axis, r denotes a paraxial radius of curvature (radius of curvature of a reference sphere), κ denotes the conical coefficient, Ci denotes the i-th order aspherical coefficient, and an aspherical coefficient corresponding to 0 is omitted. The aspherical expression is used in the following Examples, and also Examples in the second embodiment.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

The explanation of reference symbols is the same in the other examples.

TABLE 1

[Specifications]

f = 9.60 mm
2ω = 114.55°
FNO = 2.88

[Lens Data]

| surface number | r | d | ν | n |
|---|---|---|---|---|
| 1) | 45.3945 | 3.00 | 42.72 | 1.83481 |
| 2) | 29.0000 | 6.53 | | |
| 3) | 32.0000 | 2.50 | 49.52 | 1.74443 |
| 4)* | 14.3577 | 10.62 | | |
| 5) | −245.2229 | 2.00 | 65.44 | 1.60300 |
| 6) | 26.8354 | 8.05 | | |
| 7)* | 54.5332 | 0.45 | 38.09 | 1.55389 |
| 8) | −214.7108 | 1.80 | 49.60 | 1.77250 |
| 9) | 22.0000 | 9.18 | | |
| 10) | 21.1820 | 1.80 | 42.72 | 1.83481 |
| 11) | 11.9237 | 3.95 | 34.47 | 1.63980 |
| 12) | −35.9392 | 1.00 | | |
| 13) | −67.7507 | 1.31 | 42.72 | 1.83481 |
| 14) | 12.1685 | 3.35 | 34.47 | 1.63980 |
| 15) | −56.0634 | 2.50 | | |
| 16> | | 2.50 | Aperture Stop S | |
| 17) | 127.1981 | 3.18 | 41.50 | 1.57501 |
| 18) | −15.5718 | 1.00 | 42.72 | 1.83481 |
| 19) | 51.6444 | 0.50 | | |
| 20) | 20.1245 | 3.97 | 64.19 | 1.51680 |
| 21) | −30.4005 | 0.97 | | |
| 22) | −280.1131 | 1.00 | 42.72 | 1.83481 |
| 23) | 24.0089 | 4.73 | 82.52 | 1.49782 |
| 24) | −17.9838 | 0.20 | | |
| 25) | 303.0263 | 5.87 | 82.52 | 1.49782 |
| 26) | −10.7978 | 1.00 | 37.16 | 1.83400 |
| 27) | −21.6002 | B.f. | | |

[Aspherical Data]

Surface Number 4

κ = −0.9714
C4 = 2.34470E−05

TABLE 1-continued

C6 = −4.84890E−08
C8 = −2.28780E−10
C10 = 4.00550E−13

Surface Number 7

κ = −44.8014
C4 = −5.18780E−05
C6 = −7.53620E−08
C8 = −2.49430E−09
C10 = 1.87240E−11

[Variable Distances upon Focusing]

| f or β | 9.60 | −0.025 | −0.2 (R = 0.15 m) |
|---|---|---|---|
| D0 | ∞ | 362.267 | 25.560 |
| D21 | 2.952 | 2.707 | 0.969 |
| B.f. | 39.580 | 39.842 | 41.481 |

[Values for Conditional Expressions]

(1) f1/f = −2.15
(2) f2/fr = 0.65
(3) f/TL = 0.08
(4) [(dm − d0)/hm]/[(d30 − d0)/h30] = 1.57

Figure 2A:
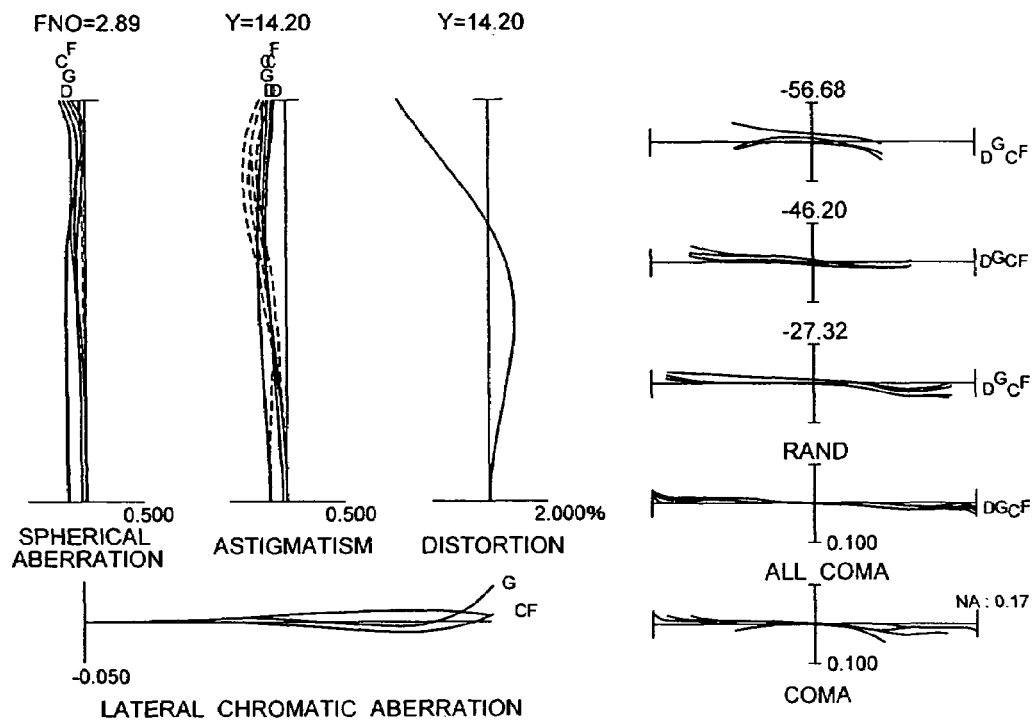
FIGS. 2A and 2B show various aberrations of the super wide-angle lens system according to Example 1 of the first embodiment upon focusing at infinity, and at shooting magnification of $-1/40$, respectively.
Figure 2B:
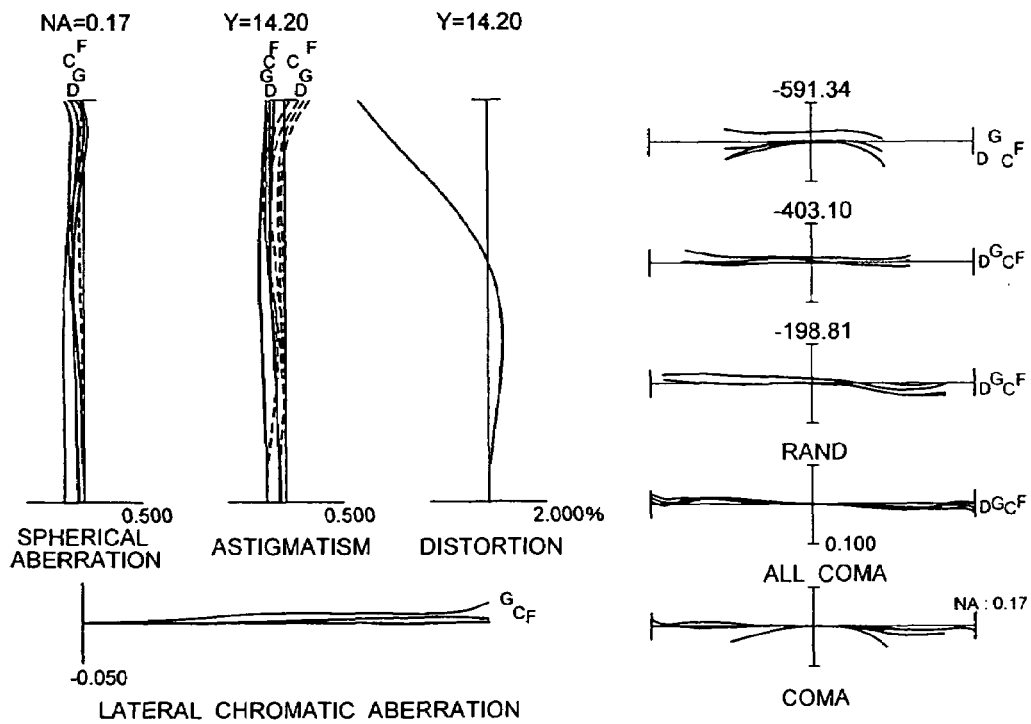

FIGS. 2A and 2B show various aberrations of the super wide-angle lens system according to Example 1 of the first embodiment upon focusing at infinity, and at shooting magnification of −1/40, respectively.

In respective graphs, FNO denotes the f-number, ω denotes a half angle of view, NA denotes the numerical aperture, Y denotes an image height, and H denotes an object height. In the graphs showing astigmatism and distortion, Y denotes the maximum value of the image height. In graphs showing spherical aberration, FNO and NA corresponds to the maximum aperture and the maximum value of the numerical aperture. Moreover, D, G, C, F denote aberration curves for d-line (λ=587.56 nm), g-line (λ=435.84 nm), C-line (λ=656.3 nm), and F-line (λ=486.1 nm), respectively. In graphs showing astigmatism, a solid line indicates a sagittal image plane, and a broken line indicates a meridional image plane.

In the following Examples, the same reference symbols as Example 1 are used.

As is apparent from respective graphs, the super wide-angle lens system according to Example 1 of the first embodiment shows superb optical performance correcting various aberrations upon focusing at infinity as well as satisfactorily correcting close-range aberration fluctuation at shooting magnification of −1/40.

EXAMPLE 2

Figure 3:
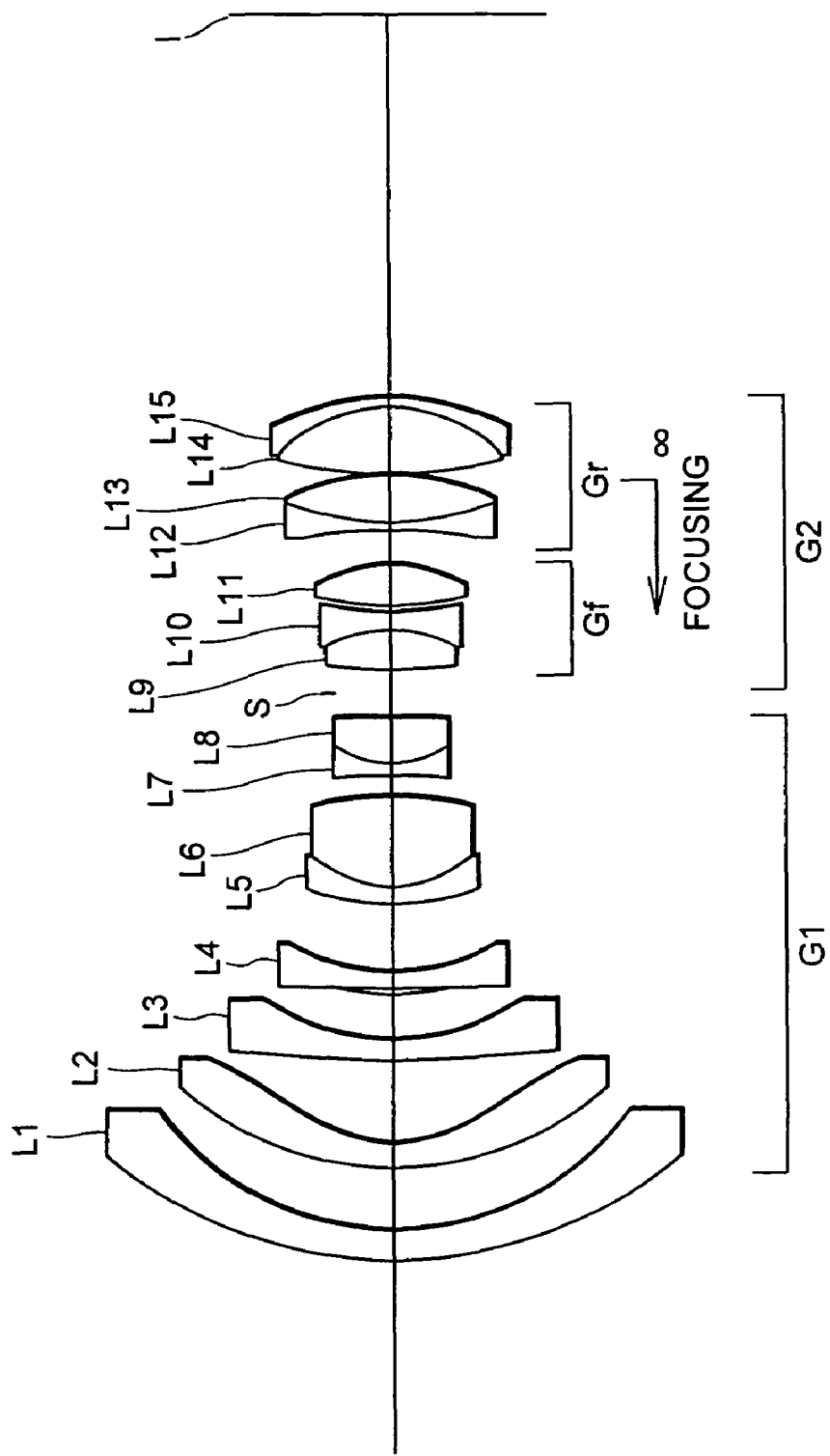
FIG. 3 is a diagram showing a sectional view of a super wide-angle lens system according to Example 2 of the first embodiment of the present invention together with a trajectory of a focusing lens group.

FIG. 3 is a diagram showing a sectional view of a super wide-angle lens system according to Example 2 of the first embodiment of the present invention together with a trajectory of a focusing lens group.

The super wide-angle lens system according to Example 2 is composed of, in order from an object, a divergent first lens group G1 having negative refractive power, an aperture stop S, and a convergent second lens group G2 having positive refractive power.

The divergent first lens group G1 is composed of, in order from the object, a negative meniscus lens L1 having a convex surface facing to the object, a negative meniscus lens L2 having a convex surface facing to the object and an aspherical surface facing to an image, a negative meniscus lens L3 having a convex surface facing to the object, a negative meniscus lens L4, a cemented positive lens constructed by a negative meniscus lens L5 having a convex surface facing to the object cemented by a thick double convex positive lens L6, and a cemented negative lens constructed by a double concave negative lens L7 cemented with a double convex positive lens L8. The negative meniscus lens L4 is a compound lens made of glass and resin. The object side glass surface of the lens L4 is applied by resin and the object side of the resin is an aspherical surface.

The convergent second lens group G2 is composed of, in order from the object, a front lens group Gf and a rear lens group Gr. The front lens group Gf is composed of, in order from the object, a cemented negative lens constructed by a double convex positive lens L9 cemented with a double concave negative lens L10, and a double convex positive lens L11. The rear lens group Gr is a focusing lens group moving for focusing composed of, in order from the object, a cemented negative lens constructed by a double concave negative lens L12 cemented with a double convex positive lens L13 and a cemented positive lens constructed by a double convex positive lens L14 cemented with a negative meniscus lens L15 having a convex surface facing to the image.

In the super wide-angle lens system according to Example 2, focusing at a close-range object is carried out by moving only the focusing lens group Gr to the object side up to the shooting distance R=0.14 m (shooting magnification $\beta$=−0.29).

In the super wide-angle lens system according to Example 2, since focusing is carried out by the lens group locating after the aperture stop S, it is suitable for a focusing method so-called "in-lens motor" method. Moreover, since the focusing lens group Gr works as a single optical system, it can be used as a so-called "vibration reduction lens group". Furthermore, it can be used as a so-called "shift lens" by shifting only the focusing lens group in off-axis direction.

Various values associated with Example 2 are listed in Table 2.

TABLE 2

[Specifications]

f = 9.61 mm
2ω = 114.14°
FNO = 2.88

[Lens Data]

| surface number | r | d | ν | n |
|---|---|---|---|---|
| 1) | 46.0209 | 3.00 | 42.72 | 1.83481 |
| 2) | 29.8742 | 6.55 | | |
| 3) | 33.4995 | 2.50 | 49.52 | 1.74443 |
| 4)* | 13.7722 | 8.50 | | |
| 5) | 163.1457 | 2.00 | 65.47 | 1.60300 |
| 6) | 23.1139 | 4.87 | | |
| 7)* | 37.1136 | 0.50 | 38.09 | 1.55389 |
| 8) | 181.7413 | 1.80 | 49.61 | 1.77250 |
| 9) | 22.7507 | 6.91 | | |
| 10) | 25.4702 | 1.80 | 42.72 | 1.83481 |
| 11) | 11.7615 | 9.47 | 34.47 | 1.63980 |
| 12) | −33.1129 | 2.05 | | |
| 13) | −71.1891 | 1.31 | 42.72 | 1.83481 |
| 14) | 10.6009 | 4.79 | 34.47 | 1.63980 |
| 15) | −62.1288 | 2.50 | | |
| 16> | | 2.50 | Aperture Stop S | |
| 17) | 54.8944 | 4.07 | 41.42 | 1.57501 |
| 18) | −13.6904 | 2.00 | 42.72 | 1.83481 |
| 19) | 37.4980 | 0.53 | | |
| 20) | 34.5873 | 4.28 | 64.10 | 1.51680 |

TABLE 2-continued

| 21) | −14.2889 | D21 | | |
|---|---|---|---|---|
| 22) | −58.2123 | 0.80 | 42.72 | 1.83481 |
| 23) | 29.3607 | 4.99 | 82.52 | 1.49782 |
| 24) | −24.8031 | 0.10 | | |
| 25) | 52.2185 | 7.00 | 82.52 | 1.49782 |
| 26) | −16.1773 | 1.00 | 37.16 | 1.83400 |
| 27) | −25.2494 | B.f. | | |

[Aspherical Data]

Surface Number 4

κ = −0.5636
C4 = 7.84270E−06
C6 = −5.71790E−08
C8 = −1.74450E−10
C10 = 4.13950E−13

Surface Number 7

κ = −2.4604
C4 = −6.08040E−05
C6 = −3.80430E−08
C8 = −8.53170E−10
C10 = 6.47390E−12

[Variable Distances upon Focusing]

| f or β | 9.61 | −0.025 | −0.29 (R = 0.14 m) |
|---|---|---|---|
| D0 | ∞ | 362.521 | 11.090 |
| D21 | 3.500 | 3.238 | 0.484 |
| B.f. | 39.580 | 39.842 | 39.580 |

[Values for Conditional Expressions]

(1) f1/f = −1.63
(2) f2/fr = 0.54
(3) f/TL = 0.07
(4) [(dm − d0)/hm]/[(d30 − d0)/h30] = 1.40

Figure 4A:
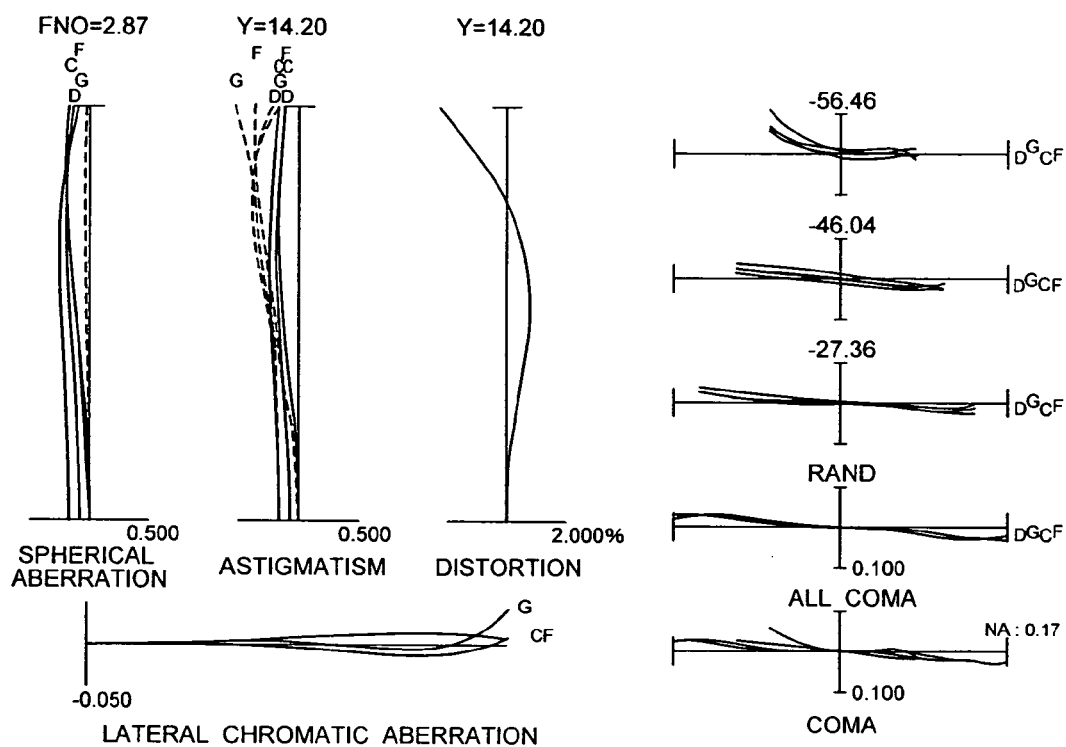
FIGS. 4A and 4B show various aberrations of the super wide-angle lens system according to Example 2 of the first embodiment upon focusing at infinity, and at shooting magnification of $-1/40$, respectively.
Figure 4B:
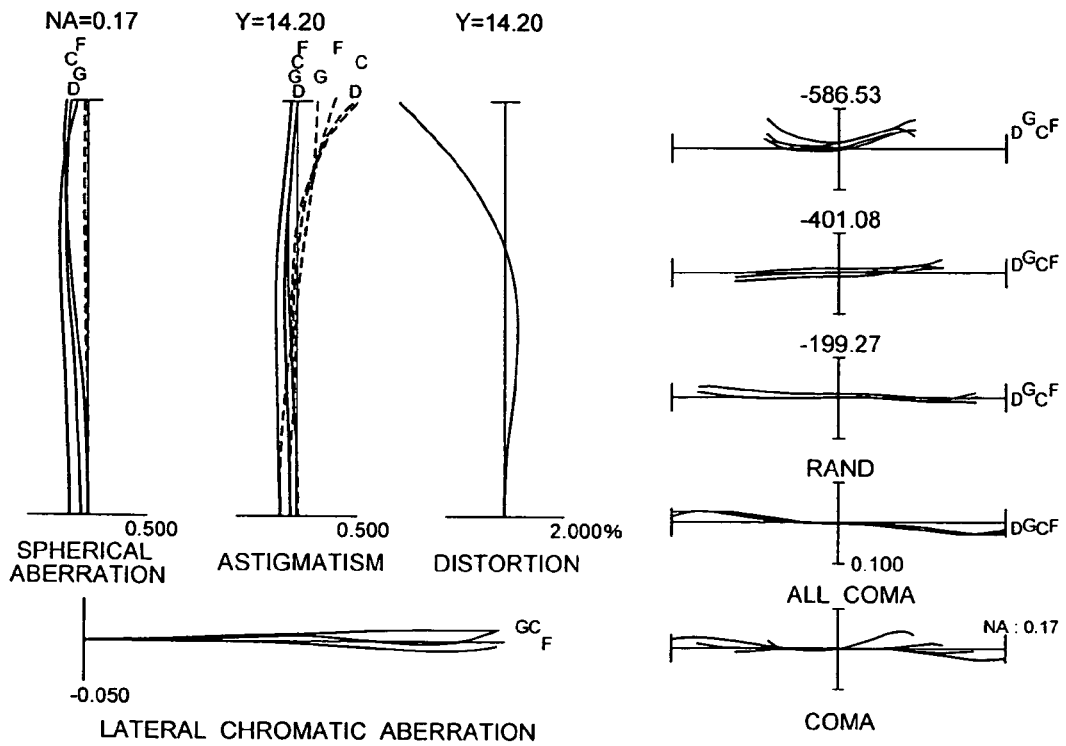

FIGS. 4A and 4B show various aberrations of the super wide-angle lens system according to Example 2 of the first embodiment upon focusing at infinity, and at shooting magnification of −1/40, respectively.

As is apparent from respective graphs, the super wide-angle lens system according to Example 2 of the first embodiment shows superb optical performance correcting various aberrations upon focusing at infinity as well as satisfactorily correcting close-range aberration fluctuation at shooting magnification of −1/40.

EXAMPLE 3

Figure 5:
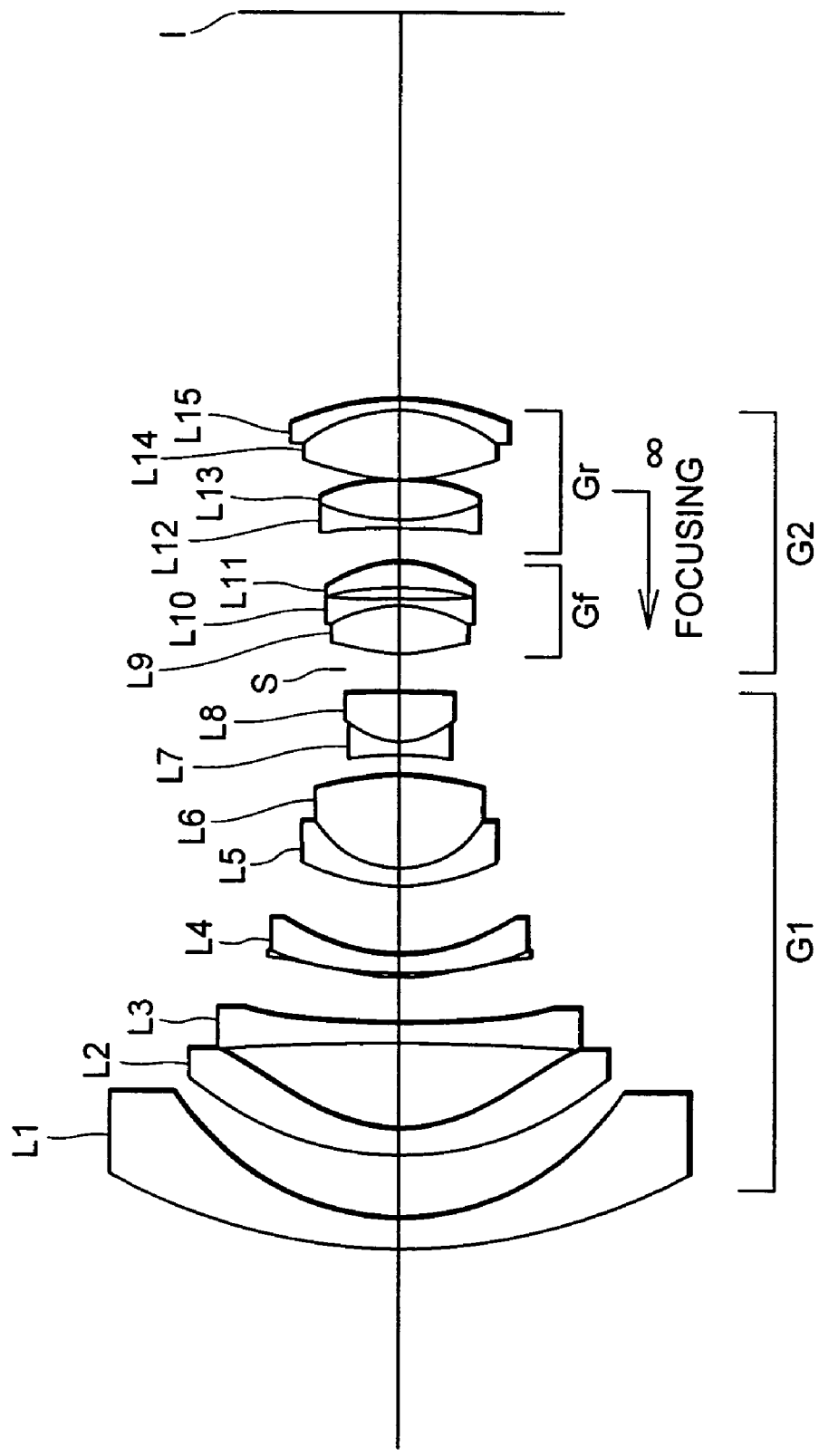
FIG. 5 is a diagram showing a sectional view of a super wide-angle lens system according to Example 3 of the first embodiment of the present invention together with a trajectory of a focusing lens group.

FIG. 5 is a diagram showing a sectional view of a super wide-angle lens system according to Example 3 of the first embodiment of the present invention together with a trajectory of a focusing lens group.

The super wide-angle lens system according to Example 3 is composed of, in order from an object, a divergent first lens group G1 having negative refractive power, an aperture stop S, and a convergent second lens group G2 having positive refractive power.

The divergent first lens group G1 is composed of, in order from the object, a negative meniscus lens L1 having a convex surface facing to the object, a negative meniscus lens L2 having a convex surface facing to the object and an aspherical surface facing to an image, a double concave negative lens L3, a negative meniscus lens L4, a cemented positive lens constructed by a negative meniscus lens L5 having a convex surface facing to the object cemented by a thick double convex positive lens L6, and a cemented negative lens constructed by a double concave negative lens L7 cemented with a positive meniscus lens L8 having a convex surface facing to the object. The negative meniscus lens L4 is a compound lens made of glass and resin. The object side glass surface of the lens L4 is applied by resin and the object side of the resin is an aspherical surface.

The convergent second lens group G2 is composed of, in order from the object, a front lens group Gf and a rear lens group Gr. The front lens group Gf is composed of, in order from the object, a cemented positive lens constructed by a double convex positive lens L9 cemented with a double concave negative lens L10, and a positive meniscus lens L11 having a convex surface facing to the image. The rear lens group Gr is a focusing lens group moving for focusing composed of, in order from the object, a cemented negative lens constructed by a double concave negative lens L12 cemented with a double convex positive lens L13 and a cemented positive lens constructed by a double convex positive lens L14 cemented with a negative meniscus lens L15 having a convex surface facing to the image.

In the super wide-angle lens system according to Example 3, focusing at a close-range object is carried out by moving only the focusing lens group Gr to the object side up to the shooting distance R=0.14 m (shooting magnification β=−0.28).

In the super wide-angle lens system according to Example 3, since focusing is carried out by the lens group locating after the aperture stop S, it is suitable for a focusing method so-called "in-lens motor" method. Moreover, since the focusing lens group Gr works as a single optical system, it can be used as a so-called "vibration reduction lens group". Furthermore, it can be used as a so-called "shift lens" by shifting only the focusing lens group in off-axis direction.

Various values associated with Example 3 are listed in Table 3.

TABLE 3

[Specifications]

f = 9.65 mm
2ω = 114.52°
FNO = 2.88

[Lens Data]

| surface number | r | d | ν | n |
|---|---|---|---|---|
| 1) | 60.4896 | 3.00 | 42.72 | 1.83481 |
| 2) | 26.2008 | 6.55 | | |
| 3) | 32.2995 | 2.50 | 49.52 | 1.74443 |
| 4)* | 13.5923 | 8.50 | | |
| 5) | −225.9333 | 2.00 | 65.47 | 1.60300 |
| 6) | 90.8040 | 4.55 | | |
| 7)* | 24.1865 | 0.50 | 38.09 | 1.55389 |
| 8) | 40.0000 | 1.80 | 49.61 | 1.77250 |
| 9) | 19.4914 | 6.91 | | |
| 10) | 21.1335 | 1.80 | 42.72 | 1.83481 |
| 11) | 9.9257 | 9.47 | 34.47 | 1.63980 |
| 12) | −25.2857 | 2.05 | | |
| 13) | −31.9557 | 1.31 | 42.72 | 1.83481 |
| 14) | 8.1116 | 4.79 | 34.47 | 1.63980 |
| 15) | 107.5828 | 2.36 | | |
| 16> | | 1.70 | Aperture Stop S | |
| 17) | 20.5509 | 4.91 | 41.42 | 1.57501 |
| 18) | −13.6110 | 0.75 | 42.72 | 1.83481 |
| 19) | 223.7084 | 1.11 | | |
| 20) | −29.8654 | 2.52 | 64.10 | 1.51680 |
| 21) | −11.9625 | D21 | | |
| 22) | −53.5813 | 0.80 | 42.72 | 1.83481 |
| 23) | 21.2995 | 4.00 | 82.52 | 1.49782 |
| 24) | −20.7604 | 0.10 | | |
| 25) | 26.6951 | 7.00 | 82.52 | 1.49782 |

TABLE 3-continued

| 26) | −15.7178 | 1.00 | 37.17 | 1.83400 |
|---|---|---|---|---|
| 27) | −26.4813 | B.f. | | |

[Aspherical Data]

Surface Number 4

κ = −0.5636
C4 = −1.67550E−05
C6 = −9.14610E−09
C8 = −1.31720E−11
C10 = 2.34160E−14

Surface Number 7

κ = −2.4604
C4 = −3.77460E−05
C6 = 2.32070E−08
C8 = 9.10260E−11
C10 = −4.65940E−13

[Variable Distances upon Focusing]

| f or β | 9.65 | −0.025 | −0.28 (R = 0.14 m) |
|---|---|---|---|
| D0 | ∞ | 366.938 | 15.176 |
| D21 | 3.476 | 3.234 | 0.747 |
| B.f. | 38.997 | 39.239 | 41.723 |

[Values for Conditional Expressions]

(1) f/f1 = −0.86
(2) f2/fr = 0.54
(3) f/TL = 0.08
(4) [(dm − d0)/hm]/[(d30 − d0)/h30] = 1.30

Figure 6A:
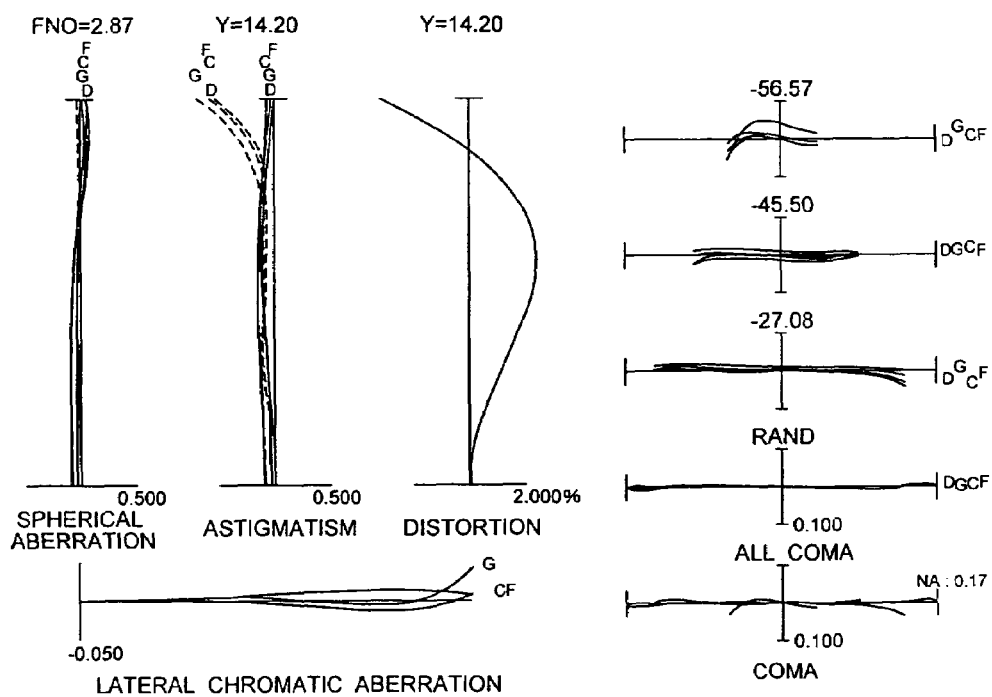
FIGS. 6A and 6B show various aberrations of the super wide-angle lens system according to Example 3 of the first embodiment upon focusing at infinity, and at shooting magnification of $-1/40$, respectively.
Figure 6B:
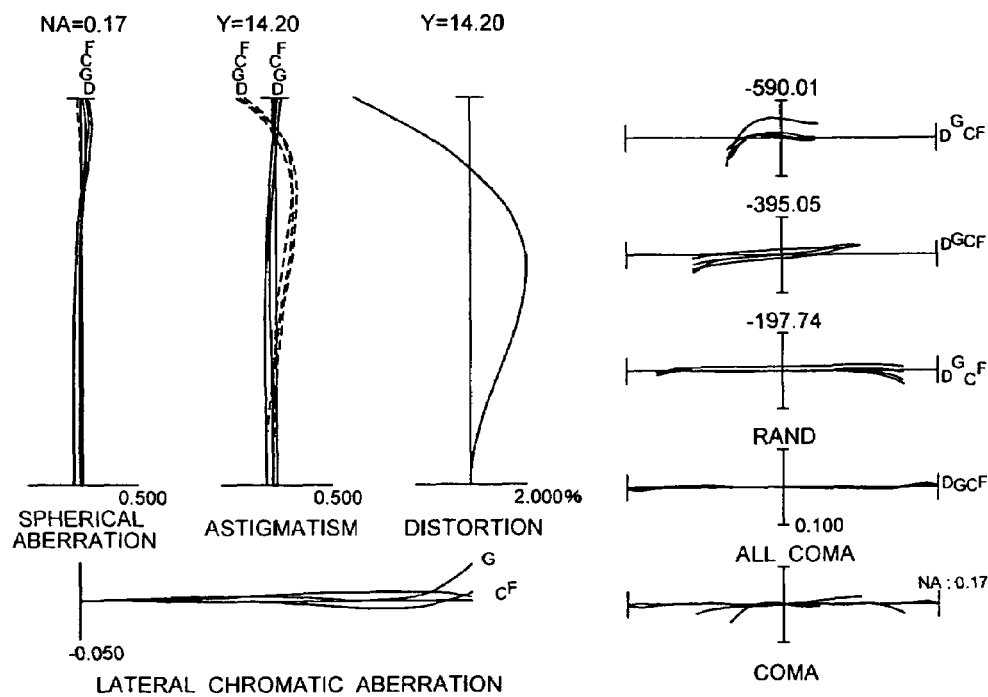

FIGS. 6A and 6B show various aberrations of the super wide-angle lens system according to Example 3 of the first embodiment upon focusing at infinity, and at shooting magnification of −1/40, respectively.

As is apparent from respective graphs, the super wide-angle lens system according to Example 3 of the first embodiment shows superb optical performance correcting various aberrations upon focusing at infinity as well as satisfactorily correcting close-range aberration fluctuation at shooting magnification of −1/40.

Figure 7:
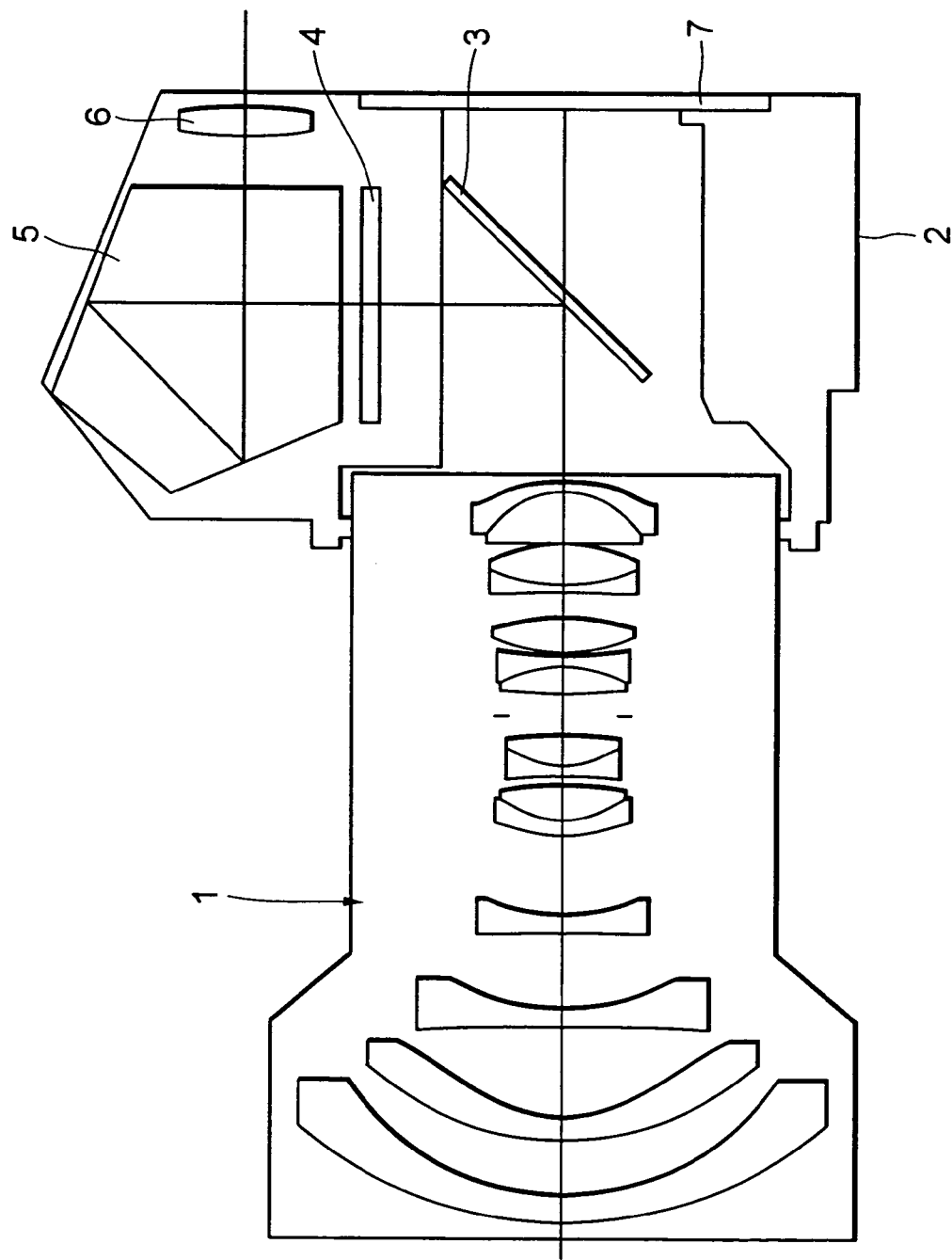
FIG. 7 is a diagram showing a construction of an SLR camera equipped with the super wide-angle lens system according to any one of Example 1 through 3 of the present invention.

A single-lens-reflex camera equipped with the super wide-angle lens system according to any one of Example 1 through Example 3 of the first embodiment is explained below. FIG. 7 is a diagram showing a construction of an SLR camera equipped with the super wide-angle lens system according to any one of Example 1 through 3 of the present invention.

As shown in FIG. 7, an SLR camera equipped with the super wide-angle lens system according to any one of Example 1 through 3 has the super wide-angle lens system according to any one of Example 1 through 3 as a shooting lens 1 in a camera body 2. In the camera body 2, in order from an object (not shown), a mirror 3, a focusing screen 4, a prism 5, and an eyepiece 6 are arranged as a view finder optical system through the shooting lens 1. Moreover, an imaging device 7 is arranged behind the mirror 3.

In this arrangement, when an observer watches an object, the light from the object passes through the shooting lens 1, the mirror 3, the focusing screen 4, the prism 5, and the eyepiece 6 to enter the observer's naked eye, so that the object is watched by the observer. When shooting the object, the mirror 3 escapes from the optical path to allow the object light to reach the imaging device 7, so that the object can be shot.

Second Embodiment

A super wide-angle lens system according to a second embodiment of the present invention includes, in order from an object, a first lens group having negative refractive power, an aperture stop, and a second lens group having positive refractive power. The first lens group includes, in order from the object, a first negative meniscus lens having a convex surface facing to the object, a positive lens having a convex surface facing to the object, and a second negative meniscus lens having a convex surface facing to the object. The second negative meniscus lens is an aspherical lens. The lens system has the back focal length 3.5 times or more longer than the focal length and the following conditional expressions (5) and (6) are satisfied:

$$-1.80 < f1/f < -0.50 \tag{5}$$

$$2.00 < f2/f < 3.60 \tag{6}$$

where f denotes the focal length of the super wide-angle lens system, f1 denotes the focal length of the first lens group, and f2 denotes the focal length of the second lens group.

As described above, the super wide-angle lens system according to the second embodiment of the present invention makes it possible to obtain a super wide angle of view of about 110° with fewer distortion by constructing the first lens group, in order from the object, a first negative meniscus lens having a convex surface facing to the object, and a positive lens having a convex surface facing to the object. Moreover, by arranging to an image side of the positive lens a second negative meniscus lens having a convex surface facing to the object, distortion and curvature of field liable to be produced in a super wide-angle lens can be satisfactorily corrected.

In the super wide-angle lens system according to the second embodiment of the present invention, conditional expressions (5) and (6) are for securing the back focal length 3.5 times or more longer than the focal length.

Conditional expression (5) defines an appropriate range of the focal length of the first lens group. When the ratio f1/f is equal to or falls below the lower limit of conditional expression (5), it becomes difficult to secure sufficient back focal length. On the other hand, when the ratio f1/f is equal to or exceeds the upper limit of conditional expression (5), refractive power of the first lens group becomes excessively strong, so that it becomes difficult to correct aberrations satisfactorily.

Conditional expression (6) defines an appropriate range of the focal length of the second lens group. When the ratio f2/f is equal to or falls below the lower limit of conditional expression (6), refractive power of the second lens group becomes excessively strong, so that it becomes difficult to correct aberrations satisfactorily. On the other hand, when the ratio f2/f is equal to or exceeds the upper limit of conditional expression (6), it becomes difficult to secure sufficient back focal length.

In order to obtain better optical performance of the present invention, it is preferable that the lower limit of conditional expression (5) is set to −1.43, the upper limit of conditional expression (5) to −0.60, the lower limit of conditional expression (6) to 2.20, and the upper limit of conditional expression (6) to 3.30.

In the super wide-angle lens system according to the second embodiment of the present invention, the following conditional expressions (7), (8), and (9) are preferably satisfied:

$$4.5 < R1/f < 9.0 \tag{7}$$

$$3.0 < R2/f < 4.5 \tag{8}$$

$$6.0 < R3/f < 15.0 \tag{9}$$

where R1 denotes the radius of curvature of the object side surface of the first negative meniscus lens, R2 denotes the radius of curvature of the image side surface of the first negative meniscus lens, and R3 denotes the radius of curvature of the object side surface of the positive lens in the first lens group.

Conditional expressions (7), (8), and (9) are for improving compactness and productivity of the first negative meniscus lens as well as securing good optical performance.

Conditional expression (7) defines an appropriate range of the radius of curvature of the object side surface of the first negative meniscus lens. When the ratio R1/f is equal to or exceeds the upper limit of conditional expression (7), the radius of curvature of the object side surface of the first negative meniscus lens becomes large, so that in order to obtain a super wide angle of view of about 110° the diameter of the first negative meniscus lens becomes excessively large. On the other hand, when the ratio R1/f is equal to or falls below the lower limit of conditional expression (7), the radius of curvature of the object side surface of the first negative meniscus lens becomes small, and that of the image side surface of the first negative meniscus lens also becomes small. As a result, fabrication of the first negative meniscus lens becomes too difficult.

Conditional expression (8) defines an appropriate range of the radius of curvature of the image side surface of the first negative meniscus lens. When the ratio R2/f is equal to or exceeds the upper limit of conditional expression (8), the radius of curvature of the image side surface of the first negative meniscus lens becomes large, so that it becomes difficult to obtain a super wide angle of view of about 110°. On the other hand, when the ratio R2/f is equal to or falls below the lower limit of conditional expression (8), fabrication of the first negative meniscus lens becomes excessively difficult.

Conditional expression (9) defines an appropriate range of the radius of curvature of the object side surface of the positive lens in the first lens group. When the ratio R3/f exceeds the upper limit or falls blow the lower limit of conditional expression (9), it becomes difficult to satisfactorily correct distortion.

In the super wide-angle lens system according to the second embodiment of the present invention, the first lens group has at least three lens elements to the image side of the second negative meniscus lens and the following conditional expression (10) is preferably satisfied for correcting distortion and curvature of field:

$$2.0 < \Sigma D/f < 4.0 \tag{10}$$

where $\Sigma D$ denotes the summation of the thicknesses of lens elements along the optical axis locating to the image side of the second negative meniscus lens in the first lens group.

Conditional expression (10) defines an appropriate range of the summation of the thicknesses of lens elements along the optical axis locating to the image side of the second negative meniscus lens in the first lens group.

When the ratio $\Sigma D/f$ is equal to or falls below the lower limit of conditional expression (10), it becomes difficult to satisfactorily correct distortion or curvature of field. On the other hand, when the ratio $\Sigma D/f$ is equal to or exceeds the upper limit of conditional expression (10), not only the total lens length of the first lens group becomes large, but also the total lens length and the diameter of the super wide-angle lens system becomes large.

In order to secure the effect of the present invention, it is preferable to set the lower limit of conditional expression (10) to 2.5.

In the super wide-angle lens system according to the second embodiment of the present invention, the image side surface of the second negative meniscus lens is preferably an aspherical surface with negative refractive power getting weaker on the periphery than the central portion. With the aspherical shape like this, distortion and curvature of field can be satisfactorily corrected.

In the super wide-angle lens system according to the second embodiment of the present invention, the second lens group has at least one positive lens and the following conditional expression (11) is preferably satisfied for correcting lateral chromatic aberration:

$$75 < \nu P \quad (11)$$

where $\nu P$ denotes the Abbe number of the glass material of the positive lens in the second lens group at d-line ($\lambda$=587.6 nm).

Conditional expression (11) defines an appropriate range of the Abbe number of the glass material of the positive lens in the second lens group at d-line ($\lambda$=587.6 nm). When the value $\nu P$ is equal to or falls below the lower limit of conditional expression (11), it becomes difficult to satisfactorily correct lateral chromatic aberration.

In the super wide-angle lens system according to the second embodiment of the present invention, the second lens group preferably has at least two positive lens elements and both positive lenses preferably satisfy conditional expression (11).

In the super wide-angle lens system according to the second embodiment of the present invention, the second lens group is composed of, in order from the object, a 2-1 lens group having positive refractive power, and a 2-2 lens group having positive refractive power. Focusing from infinity to a close-range object is carried out by moving the 2-2 lens group to the object side. The following conditional expressions (12) and (13) are preferably satisfied:

$$0.4 < f21/f22 < 0.8 \quad (12)$$

$$0.1 < M22 < 0.4 \quad (13)$$

where f21 denotes the focal length of the 2-1 lens group, f22 denotes the focal length of the 2-2 lens group, and M22 denotes imaging magnification of the 2-2 lens group.

In the super wide-angle lens system according to the second embodiment of the present invention, since focusing is carried out by the relatively small and light 2-2 lens group, it is suitable for an auto-focusing camera. Variation in various aberration is relatively smaller than a unit-focusing type lens, so that satisfactory optical performance can be obtained even in a close-range shooting.

Conditional expression (12) defines an appropriate range of the ratio of the focal length of the 2-1 lens group to that of the 2-2 lens group. When the ratio f21/f22 is equal to or exceeds the upper limit of conditional expression (12), variation in various aberrations upon focusing becomes large, so that it becomes difficult to secure satisfactory optical performance upon shooting at close-range. On the other hand, when the ratio f21/f22 is equal to or falls below the lower limit of conditional expression (12), the focal length of the 2-2 lens group becomes large, so that moving amount of the 2-2 lens group upon focusing becomes large. Accordingly, in order to secure the space for the moving lens group, the lens system itself becomes large.

In the super wide-angle lens system according to the second embodiment of the present invention, the second lens group is composed of, in order from the object, a 2-1 lens group having positive refractive power, a 2-2 lens group having positive refractive power, and a 2-3 lens group having positive refractive power. Focusing from infinity to a close-range object is carried out by moving only the 2-2 lens group to the object side. The following conditional expressions (14) and (15) are preferably satisfied:

$$0.5 < f22/f23 < 1.2 \quad (14)$$

$$0.3 < M22 < 0.9 \quad (15)$$

where f22 denotes the focal length of the 2-2 lens group, f23 denotes the focal length of the 2-3 lens group, and M22 denotes imaging magnification of the 2-2 lens group.

In the super wide-angle lens system according to the second embodiment of the present invention, since focusing is carried out by the relatively small and light 2-2 lens group, it is suitable for an auto-focusing camera. Variation in various aberration is relatively smaller than a unit-focusing type lens, so that satisfactory optical performance can be obtained even in a close-range shooting.

Conditional expression (14) defines an appropriate range of the ratio of the focal length of the 2-2 lens group to that of the 2-3 lens group. When the ratio f22/f23 is equal to or falls below the lower limit of conditional expression (14), variation in various aberrations upon focusing becomes large, so that it becomes difficult to secure satisfactory optical performance upon shooting at close-range. On the other hand when the ratio f22/f23 is equal to or exceeds the upper limit of conditional expression (14), the focal length of the 2-2 lens group becomes large, so that moving amount of the 2-2 lens group upon focusing becomes large. Accordingly, in order to secure the space for the moving lens group, the lens system itself becomes large.

Conditional expression (15) defines an appropriate range of imaging magnification of the 2-2 lens group. When the value M22 is equal to or falls below the lower limit of conditional expression (15), variation in various aberrations upon focusing becomes large, so that it becomes difficult to secure satisfactory optical performance upon shooting at close-range. On the other hand, when the value M22 is equal to or exceeds the upper limit of conditional expression (15), moving amount of the 2-2 lens group upon focusing becomes large. Accordingly, in order to secure the space for the moving lens group, the lens system itself becomes large.

In the super wide-angle lens system according to the second embodiment of the present invention, the second lens group is composed of, in order from the object, a 2-1 lens group having positive refractive power, a 2-2 lens group, and a 2-3 lens group having positive refractive power. Focusing from infinity to a close-range object is carried out by moving the 2-2 lens group and the 2-3 lens group to the object side with different speeds. The following conditional expression (16) is preferably satisfied:

$$0 < A < 1 \quad (16)$$

where A denotes a ratio of the moving amount of the 2-3 lens group to that of the 2-2 lens group upon focusing.

In the super wide-angle lens system according to the second embodiment of the present invention, since focusing is carried out by moving the 2-2 lens group and the 2-3 lens group with different speeds, variation in various aberration is relatively smaller than a unit-focusing type lens, so that satisfactory optical performance can be obtained even in a close-range shooting.

Conditional expression (16) defines an appropriate range of the moving ratio of the 2-3 lens group to the 2-2 lens group in order to suppress variation in various aberrations upon focusing reducing the air space for focusing. When the value A is exceeds the upper limit or falls below the lower limit of conditional expression (16), it becomes difficult to reduce the air space for focusing and to suppress variation in various aberrations, so that it is undesirable.

The super wide-angle lens system according to the second embodiment of the present invention includes, in order from the object, a first lens group having negative refractive power, an aperture stop, and a second lens group having positive refractive power. The first lens group includes, in order from the object, a first negative meniscus lens having a convex surface facing to the object, a positive lens having a convex surface facing to the object, a second negative meniscus lens having a convex surface facing to the object, and at least three lens elements. The second negative meniscus lens is an aspherical lens. The back focal length of the lens system is 3.5 times or more longer than the focal length of the lens system. The following conditional expression (10) is satisfied:

$$2.0 < \Sigma D/f < 4.0 \qquad (10)$$

where $\Sigma D$ denotes the summation of the thicknesses of lens elements along the optical axis locating to the image side of the second negative meniscus lens in the first lens group.

The super wide-angle lens system according to each Example of the second embodiment of the present invention is explained below with reference to accompanying drawings.

EXAMPLE 4

FIG. 8 is a diagram showing a sectional view of a super wide-angle lens system according to Example 4 of the second embodiment of the present invention together with a trajectory of a focusing lens group.

As shown is FIG. 8, the super wide-angle lens system according to Example 4 of the second embodiment of the present invention is composed of, in order from an object, a first lens group G1 having negative refractive power, an aperture stop S, and a second lens group G2 having positive refractive power.

The first lens group G1 is composed of, in order from the object, a negative meniscus lens (a first negative meniscus lens) L11 having a convex surface facing to the object, a double convex positive lens L12 having a convex surface with larger curvature facing to the object, a negative meniscus lens (a second negative meniscus lens) L13 having a convex surface facing to the object and an aspherical surface facing to the image with negative refractive power getting weaker on the periphery than the central portion, a negative meniscus lens L14 having a convex surface facing to the object, a negative meniscus lens L15 having a convex surface facing to the object and an aspherical surface facing to the object, a cemented lens constructed by a negative meniscus lens L16 having a convex surface facing to the object cemented with a double convex positive lens L17, and a cemented lens constructed by a double concave negative lens L18 cemented with a positive meniscus lens L19 having a convex surface facing to the object.

The second lens group G2 is composed of, in order from the object, a 2-1 lens group G21 having positive refractive power, and a 2-2 lens group G22 having positive refractive power.

The 2-1 lens group G21 is composed of, in order from the object, a cemented lens constructed by a double convex positive lens L21 cemented with a double concave negative lens L22, and a double convex positive lens L23 having an aspherical surface facing to the object.

The 2-2 lens group G22 is composed of, in order from the object, a cemented lens constructed by a double concave negative lens L24 cemented with a double convex positive lens L25, and a cemented lens constructed by a double convex positive lens L26 cemented with a negative meniscus lens L27 having a concave surface facing to the object.

In each aspherical lens, L13 or L15, a thin resin layer is formed on a spherical lens surface and an aspherical surface is formed on the outer surface of the resin layer resulting in an aspherical lens.

Each of two positive lenses L25 and L26 in the 2-2 lens group G22 is a low dispersion glass having Abbe number of 82.52 at d-line ($\lambda$=587.6 nm).

In the super wide-angle lens system according to Example 4 of the second embodiment, focusing from infinity to a close-range object is carried out by moving only the 2-2 lens group G22 to the object.

Various values associated with Example 4 are listed in Table 4.

TABLE 4

[Specifications]

f = 9.601 mm
$2\omega$ = 114.6°
FNO = 2.90

[Lens Data]

| surface number | r | d | ν | n |
|---|---|---|---|---|
| 1 | 60.2661 | 3.0000 | 42.72 | 1.834807 |
| 2 | 36.0000 | 8.4044 | | |
| 3 | 83.8526 | 6.1778 | 38.03 | 1.603420 |
| 4 | −1743.6769 | 0.2000 | | |
| 5 | 62.2757 | 2.0000 | 42.72 | 1.834807 |
| 6 | 24.7178 | 0.0300 | 38.09 | 1.553890 |
| 7* | 16.0000 | 3.0000 | | |
| 8 | 32.0080 | 1.8000 | 46.57 | 1.804000 |
| 9 | 14.4893 | 4.5658 | | |
| 10* | 28.5432 | 0.0300 | 38.09 | 1.553890 |
| 11 | 30.0496 | 1.8000 | 46.57 | 1.804000 |
| 12 | 19.9120 | 2.3084 | | |
| 13 | 85.2909 | 7.9000 | 42.72 | 1.834807 |
| 14 | 14.3748 | 7.7710 | 40.75 | 1.581439 |
| 15 | −29.9543 | 1.0000 | | |
| 16 | −124.0020 | 7.9000 | 42.72 | 1.834807 |
| 17 | 10.4109 | 2.9009 | 31.07 | 1.688931 |
| 18 | 107.6002 | 2.5000 | | |
| 19 | ∞ | 2.5000 | Aperture Stop S | |
| 20 | 25.4917 | 4.2387 | 30.13 | 1.698947 |
| 21 | −13.1233 | 2.9254 | 42.72 | 1.834807 |
| 22 | 30.3460 | 1.0000 | | |
| 23* | 18.6639 | 4.0275 | 59.37 | 1.583126 |
| 24 | −34.1660 | (D24) | | |
| 25 | −146.3255 | 1.2000 | 34.97 | 1.800999 |
| 26 | 21.8526 | 5.9159 | 82.52 | 1.497820 |
| 27 | −17.9639 | 0.2000 | | |
| 28 | 94.0076 | 7.1721 | 82.52 | 1.497820 |
| 29 | −11.2149 | 1.2000 | 34.97 | 1.800999 |
| 30 | −26.0232 | (B.f.) | | |

TABLE 4-continued

[Aspherical Data]

Surface Number 7

κ = 0.5846
C3 = −3.3743E−04
C4 = −5.5950E−05
C5 = −9.1178E−07
C6 = 2.5516E−07
C8 = −1.0582E−09
C10 = 2.5841E−12
C12 = −1.1711E−15

Surface Number 10

κ = −97.0000
C3 = 1.0204E−03
C4 = 1.8608E−05
C5 = −6.8249E−06
C6 = 1.0391E−07
C8 = 1.5121E−09
C10 = 7.5178E−12
C12 = −1.8108E−14

Surface Number 23

κ = 0.8836
C3 = −6.2430E−05
C4 = −2.8643E−06
C5 = −8.1856E−07
C6 = −9.4280E−08
C8 = 2.1543E−09
C10 = −2.1539E−11
C12 = 7.6069E−14

[Variable Distances upon Focusing]

| f or β | 9.60105 | −0.02500 |
|---|---|---|
| R | ∞ | 495.23665 |
| D0 | ∞ | 359.4769 |
| D24 | 2.59195 | 2.34124 |
| B.f. | 39.49999 | 39.75070 |

[Values for Conditional Expressions]

(5) f1/f = −0.756
(6) f2/f = 2.359
(7) R1/f = 6.277
(3) R2/f = 3.750
(9) R3/f = 8.734
(10) ΣD/f = 3.135
(11) νP = 82.52
(12) f21/f22 = 0.562
(13) M22 = 0.209

Figure 9A:
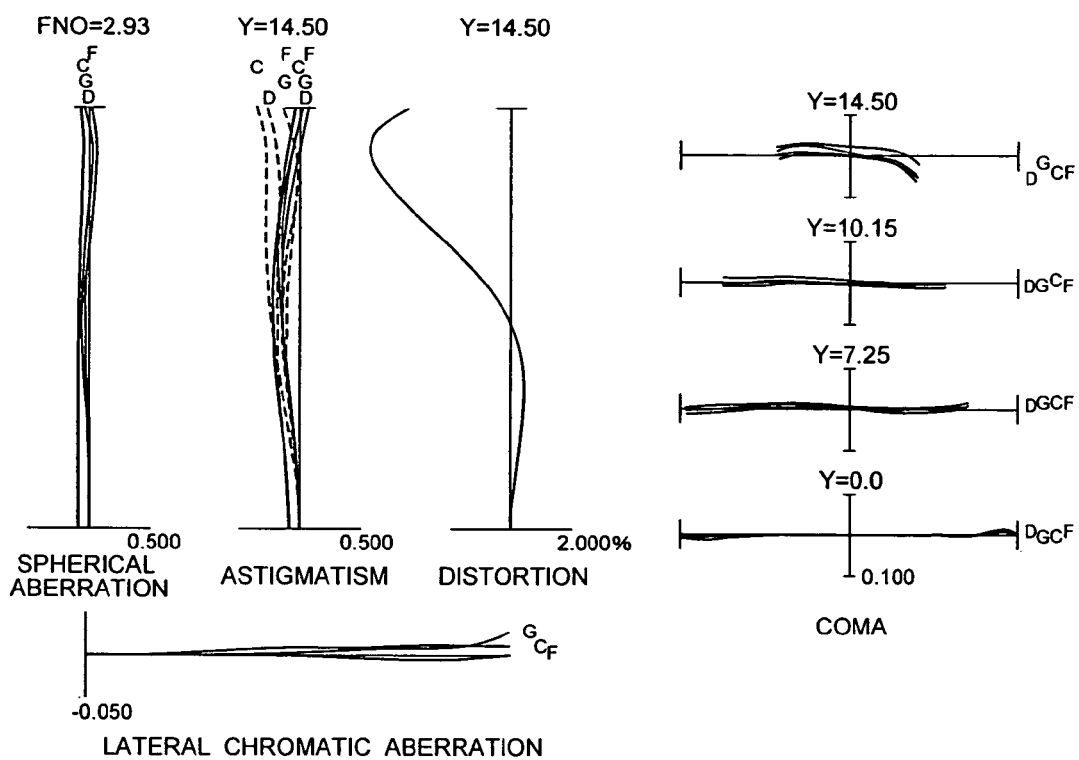
FIGS. 9A and 9B show various aberrations of the super wide-angle lens system according to Example 4 of the second embodiment upon focusing at infinity, and at shooting magnification of $-1/40$, respectively.
Figure 9B:
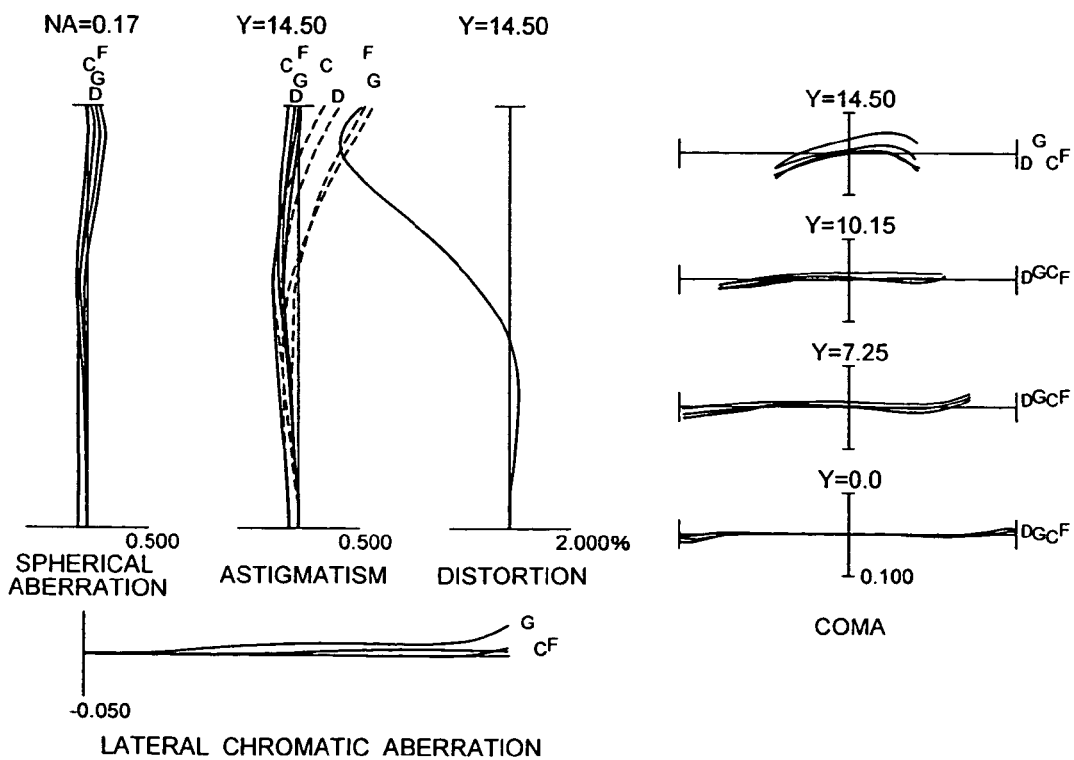

FIGS. 9A and 9B show various aberrations of the super wide-angle lens system according to Example 4 of the second embodiment upon focusing at infinity, and at shooting magnification of −1/40, respectively.

As is apparent from respective graphs, the super wide-angle lens system according to Example 4 of the second embodiment shows superb optical performance correcting various aberrations upon focusing at infinity as well as satisfactorily correcting close-range aberration fluctuation at shooting magnification of −1/40.

EXAMPLE 5

FIG. 10 is a diagram showing a sectional view of a super wide-angle lens system according to Example 5 of the second embodiment of the present invention together with a trajectory of a focusing lens group.

As shown is FIG. 10, the super wide-angle lens system according to Example 5 of the second embodiment of the present invention is composed of, in order from an object, a first lens group G1 having negative refractive power, an aperture stop S, and a second lens group G2 having positive refractive power.

The first lens group G1 is composed of, in order from the object, a negative meniscus lens (a first negative meniscus lens) L11 having a convex surface facing to the object, a double convex positive lens L12 having a convex surface with larger curvature facing to the object, a negative meniscus lens (a second negative meniscus lens) L13 having a convex surface facing to the object and an aspherical surface facing to the image with negative refractive power getting weaker on the periphery than the central portion, a negative meniscus lens L14 having a convex surface facing to the object, a negative meniscus lens L15 having a convex surface facing to the object and an aspherical surface facing to the object, a cemented lens constructed by a negative meniscus lens L16 having a convex surface facing to the object cemented with a double convex positive lens L17, and a cemented lens constructed by a double concave negative lens L18 cemented with a double convex positive lens L19.

The second lens group G2 is composed of, in order from the object, a 2-1 lens group G21 having positive refractive power, a 2-2 lens group G22 having positive refractive power, and a 2-3 lens group G23 having positive refractive power.

The 2-1 lens group G21 is composed of, in order from the object, a cemented lens constructed by a positive meniscus lens L21 having a concave surface facing to the object cemented with a double concave negative lens L22, and a double convex positive lens L23 having an aspherical surface facing to the object.

The 2-2 lens group G22 is composed of, in order from the object, a cemented lens constructed by a negative meniscus lens L24 having a convex surface facing to the object cemented with a double convex positive lens L25.

The 2-3 lens group G23 is composed of, in order from the object, a cemented lens constructed by a double convex positive lens L26 cemented with a negative meniscus lens L27 having a concave surface facing to the object.

In each aspherical lens, L13 or L15, a thin resin layer is formed on a spherical lens surface and an aspherical surface is formed on the outer surface of the resin layer resulting in an aspherical lens.

Each of two positive lenses L25 and L26 in the 2-2 lens group G22 and in the 2-3 lens group G23, respectively, is a low dispersion glass having Abbe number of 82.52 at d-line (λ=587.6 nm).

In the super wide-angle lens system according to Example 5 of the second embodiment, focusing from infinity to a close-range object is carried out by moving only the 2-2 lens group G22 to the object.

Various values associated with Example 5 are listed in Table 5.

TABLE 5

[Specifications]

f = 9.600 mm
2ω = 114.6°
FNO = 2.91

[Lens Data]

| surface number | r | d | ν | n |
|---|---|---|---|---|
| 1 | 60.1249 | 3.0000 | 42.72 | 1.834807 |
| 2 | 36.0000 | 10.0898 | | |
| 3 | 117.2702 | 5.6999 | 38.03 | 1.603420 |

TABLE 5-continued

| | | | | |
|---|---|---|---|---|
| 4 | −492.5233 | 0.2000 | | |
| 5 | 63.6210 | 2.0000 | 42.72 | 1.834807 |
| 6 | 23.9941 | 0.0300 | 38.09 | 1.553890 |
| 7* | 16.0045 | 3.1212 | | |
| 8 | 31.8950 | 1.8000 | 46.57 | 1.804000 |
| 9 | 15.0108 | 5.1519 | | |
| 10* | 26.1235 | 0.0300 | 38.09 | 1.553890 |
| 11 | 27.7603 | 1.8000 | 46.57 | 1.804000 |
| 12 | 21.3064 | 2.2465 | | |
| 13 | 93.4386 | 7.8645 | 42.72 | 1.834807 |
| 14 | 15.0138 | 7.8966 | 40.75 | 1.581439 |
| 15 | −22.8094 | 1.0000 | | |
| 16 | −49.2357 | 5.2516 | 42.72 | 1.834807 |
| 17 | 11.1925 | 3.6385 | 31.07 | 1.688931 |
| 18 | −48.2372 | 2.5000 | | |
| 19 | ∞ | 2.5000 | Aperture Stop S | |
| 20 | −58.7292 | 7.2984 | 30.13 | 1.698947 |
| 21 | −9.9231 | 1.2000 | 42.72 | 1.834807 |
| 22 | 64.6725 | 1.0000 | | |
| 23* | 21.0819 | 4.6115 | 59.37 | 1.583126 |
| 24 | −18.9298 | (D24) | | |
| 25 | 252.2779 | 1.2000 | 34.97 | 1.800999 |
| 26 | 16.3556 | 7.3092 | 82.52 | 1.497820 |
| 27 | −21.5606 | (D27) | | |
| 28 | 214.8765 | 5.8458 | 82.52 | 1.497820 |
| 29 | −16.2225 | 1.2000 | 34.97 | 1.800999 |
| 30 | −34.4814 | (B.f.) | | |

[Aspherical Data]

Surface Number 7

$\kappa = 0.5601$
$C3 = -2.1219E-04$
$C4 = -6.2117E-05$
$C5 = -7.7649E-07$
$C6 = 2.6144E-07$
$C8 = -1.0854E-09$
$C10 = 2.5097E-12$
$C12 = -4.3508E-16$ Surface Number 10

$\kappa = -97.0000$
$C3 = 1.5638E-03$
$C4 = -2.2761E-05$
$C5 = -6.9812E-06$
$C6 = 1.3536E-07$
$C8 = 1.6737E-09$
$C10 = 8.3830E-12$
$C12 = -3.0489E-14$ Surface Number 23

$\kappa = -0.1486$
$C3 = -8.5063E-05$
$C4 = -1.4591E-05$
$C5 = -5.2319E-07$
$C6 = -8.0478E-08$
$C8 = 1.6567E-09$
$C10 = -1.5604E-11$
$C12 = 6.4136E-14$

[Variable Distances upon Focusing]

| f or β | 9.60000 | −0.02500 |
|---|---|---|
| R | ∞ | 499.28597 |
| D0 | ∞ | 358.5661 |
| D24 | 5.03444 | 4.41809 |
| D27 | 0.70000 | 1.31636 |
| B.f. | 39.50002 | 39.50002 |

[Values for Conditional Expressions]

(5) f1/f = −1.406
(6) f2/f = 2.782
(7) R1/f = 6.263
(8) R2/f = 3.750
(9) R3/f = 12.216
(10) ΣD/f = 2.946
(11) νP = 82.52

TABLE 5-continued

(14) f22/f23 = 0.748
(15) M22 = 0.507

Figure 11A:
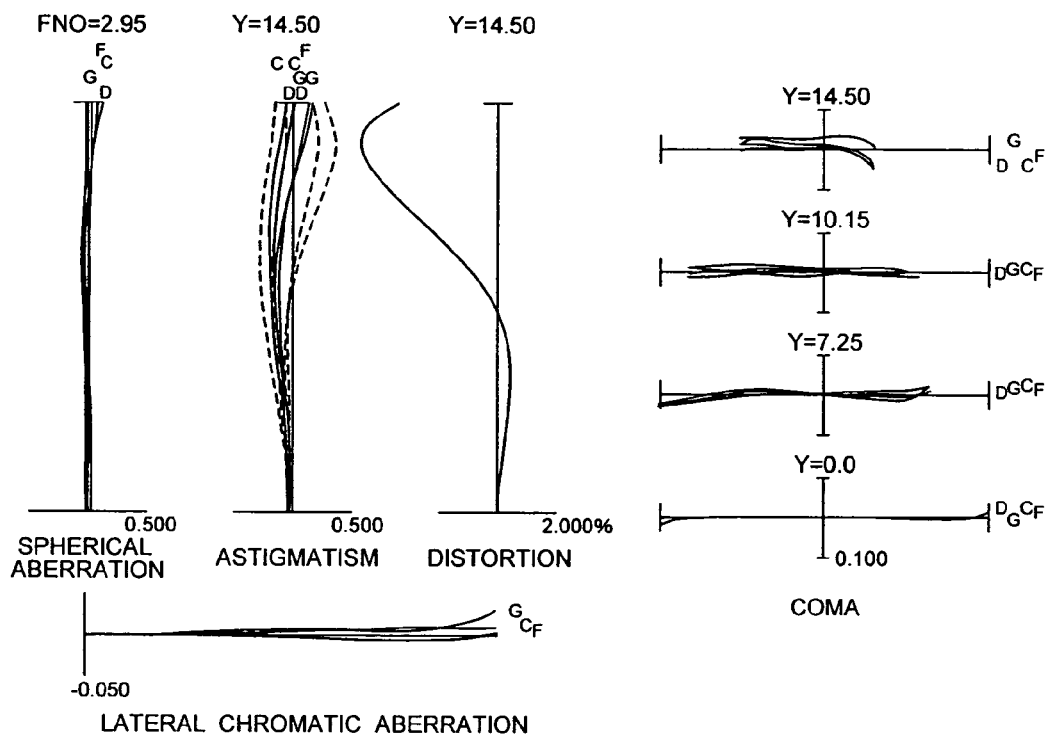
FIGS. 11A and 11B show various aberrations of the super wide-angle lens system according to Example 5 of the second embodiment upon focusing at infinity, and at shooting magnification of $-1/40$, respectively.
Figure 11B:
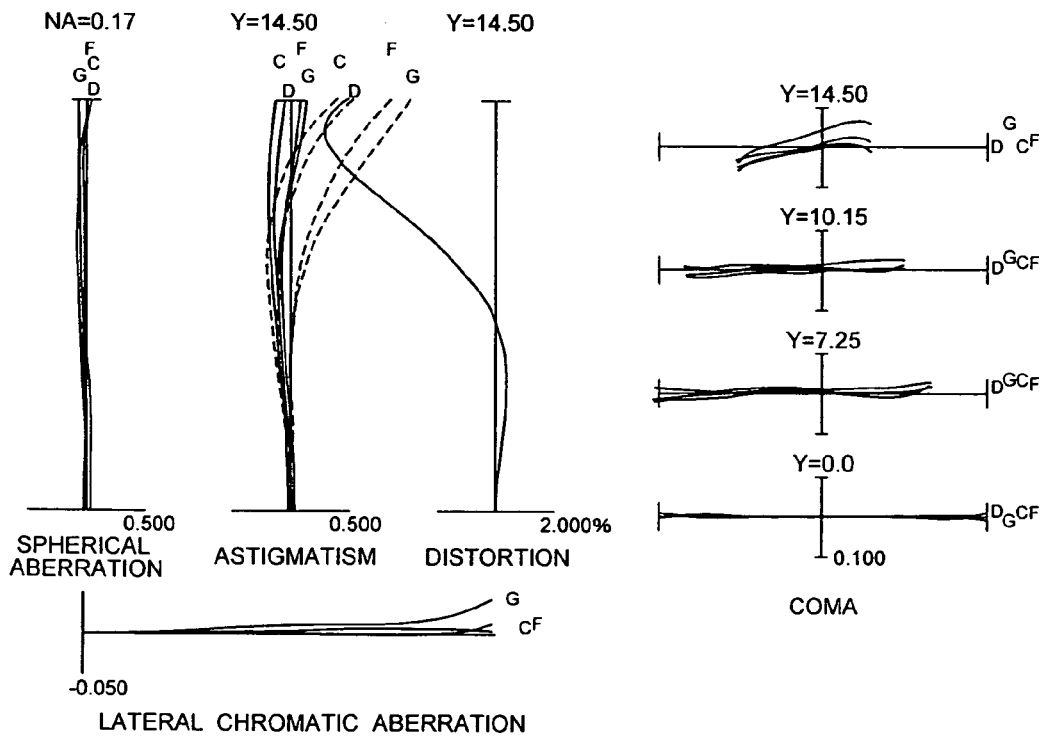

FIGS. 11A and 11B show various aberrations of the super wide-angle lens system according to Example 5 of the second embodiment upon focusing at infinity, and at shooting magnification of −1/40, respectively.

As is apparent from respective graphs, the super wide-angle lens system according to Example 5 of the second embodiment shows superb optical performance correcting various aberrations upon focusing at infinity as well as satisfactorily correcting close-range aberration fluctuation at shooting magnification of −1/40.

EXAMPLE 6

FIG. 12 is a diagram showing a sectional view of a super wide-angle lens system according to Example 6 of the second embodiment of the present invention together with a trajectory of a focusing lens group.

As shown is FIG. 12, the super wide-angle lens system according to Example 6 of the second embodiment of the present invention is composed of, in order from an object, a first lens group G1 having negative refractive power, an aperture stop S, and a second lens group G2 having positive refractive power.

The first lens group G1 is composed of, in order from the object, a negative meniscus lens (a first negative meniscus lens) L11 having a convex surface facing to the object, a double convex positive lens L12 having a convex surface with larger curvature facing to the object, a negative meniscus lens (a second negative meniscus lens) L13 having a convex surface facing to the object and an aspherical surface facing to the image with negative refractive power getting weaker on the periphery than the central portion, a negative meniscus lens L14 having a convex surface facing to the object, a negative meniscus lens L15 having a convex surface facing to the object and an aspherical surface facing to the object, a cemented lens constructed by a negative meniscus lens L16 having a convex surface facing to the object cemented with a double convex positive lens L17, and a cemented lens constructed by a double concave negative lens L18 cemented with a double convex positive lens L19.

The second lens group G2 is composed of, in order from the object, a 2-1 lens group G21 having positive refractive power, a 2-2 lens group G22 having positive refractive power, and a 2-3 lens group G23 having positive refractive power.

The 2-1 lens group G21 is composed of, in order from the object, a cemented lens constructed by a double convex positive lens L21 cemented with a double concave negative lens L22, and a double convex positive lens L23 having an aspherical surface facing to the object.

The 2-2 lens group G22 is composed of, in order from the object, a cemented lens constructed by a negative meniscus lens L24 having a convex surface facing to the object cemented with a double convex positive lens L25.

The 2-3 lens group G23 is composed of, in order from the object, a cemented lens constructed by a double convex positive lens L26 cemented with a negative meniscus lens L27 having a concave surface facing to the object.

In each aspherical lens, L13 or L15, a thin resin layer is formed on a spherical lens surface and an aspherical surface is formed on the outer surface of the resin layer resulting in an aspherical lens.

Each of two positive lenses L25 and L26 in the 2-2 lens group G22 and in the 2-3 lens group G23, respectively, is a low dispersion glass having Abbe number of 82.52 at d-line ($\lambda$=587.6 nm).

In the super wide-angle lens system according to Example 6 of the second embodiment, focusing from infinity to a close-range object is carried out by moving only the 2-2 lens group G22 to the object.

Various values associated with Example 6 are listed in Table 6.

TABLE 6

[Specifications]

f = 9.600 mm
2ω = 114.6°
FNO = 2.89

[Lens Data]

| surface number | r | d | ν | n |
|---|---|---|---|---|
| 1 | 62.4243 | 3.0000 | 42.72 | 1.834807 |
| 2 | 36.0000 | 8.5125 | | |
| 3 | 88.9172 | 5.9757 | 38.03 | 1.603420 |
| 4 | −1035.1271 | 0.2000 | | |
| 5 | 55.6701 | 2.0000 | 42.72 | 1.834807 |
| 6 | 24.4921 | 0.0300 | 38.09 | 1.553890 |
| 7* | 16.0000 | 3.0000 | | |
| 8 | 31.6577 | 1.8000 | 46.57 | 1.804000 |
| 9 | 13.9993 | 4.6833 | | |
| 10* | 27.9422 | 0.0300 | 38.09 | 1.553890 |
| 11 | 30.0568 | 1.8000 | 46.57 | 1.804000 |
| 12 | 21.3769 | 2.0484 | | |
| 13 | 83.3011 | 7.9000 | 42.72 | 1.834807 |
| 14 | 13.6672 | 7.2189 | 40.75 | 1.581439 |
| 15 | −23.8796 | 1.0000 | | |
| 16 | −51.5310 | 7.5482 | 42.72 | 1.834807 |
| 17 | 11.7021 | 2.8501 | 31.07 | 1.688931 |
| 18 | −511.4076 | 2.5000 | | |
| 19 | ∞ | 2.5000 | Aperture Stop S | |
| 20 | 49.3837 | 3.8308 | 30.13 | 1.698947 |
| 21 | −11.5535 | 5.4132 | 42.72 | 1.834807 |
| 22 | 45.1690 | 1.0000 | | |
| 23* | 21.9416 | 4.3577 | 59.37 | 1.583126 |
| 24 | −23.4144 | (D24) | | |
| 25 | 931.0004 | 1.2000 | 34.97 | 1.800999 |
| 26 | 16.5951 | 6.8029 | 82.52 | 1.497820 |
| 27 | −20.8577 | (D27) | | |
| 28 | 129.9447 | 5.6592 | 82.52 | 1.497820 |
| 29 | −16.0099 | 1.2000 | 34.97 | 1.800999 |
| 30 | −35.6169 | (B.f.) | | |

[Aspherical Data]

Surface Number 7

κ = 0.5999
C3 = −2.7406E−04
C4 = −6.3204E−05
C5 = −7.7218E−07
C6 = 2.6957E−07
C8 = −1.0800E−09
C10 = 2.3419E−12
C12 = −4.9029E−16
Surface Number 10

κ = −97.0000
C3 = 1.2351E−03
C4 = −1.7517E−05
C5 = −4.8500E−06
C6 = 1.0460E−07

TABLE 6-continued

C8 = 7.1238E−10
C10 = 1.2855E−11
C12 = −2.5861E−14
Surface Number 23

κ = 0.4762
C3 = −6.2611E−05
C4 = −6.7244E−06
C5 = −4.1881E−07
C6 = −9.8355E−08
C8 = 1.5649E−09
C10 = −1.2689E−11
C12 = 3.6962E−14

[Variable Distances upon Focusing]

| f or β | 9.59998 | −0.02500 |
|---|---|---|
| R | ∞ | 497.88726 |
| D0 | ∞ | 359.6655 |
| d24 | 3.66092 | 2.94751 |
| d27 | 1.00000 | 1.71342 |
| B.f. | 39.50006 | 39.50006 |

[Values for Conditional Expressions]

(5) f1/f = −0.879
(6) f2/f = 2.522
(7) R1/f = 6.503
(8) R2/f = 3.750
(9) R3/f = 9.262
(10) ΣD/f = 3.036
(11) νP = 82.52
(14) f22/f23 = 0.906
(15) M22 = 0.697

Figure 13A:
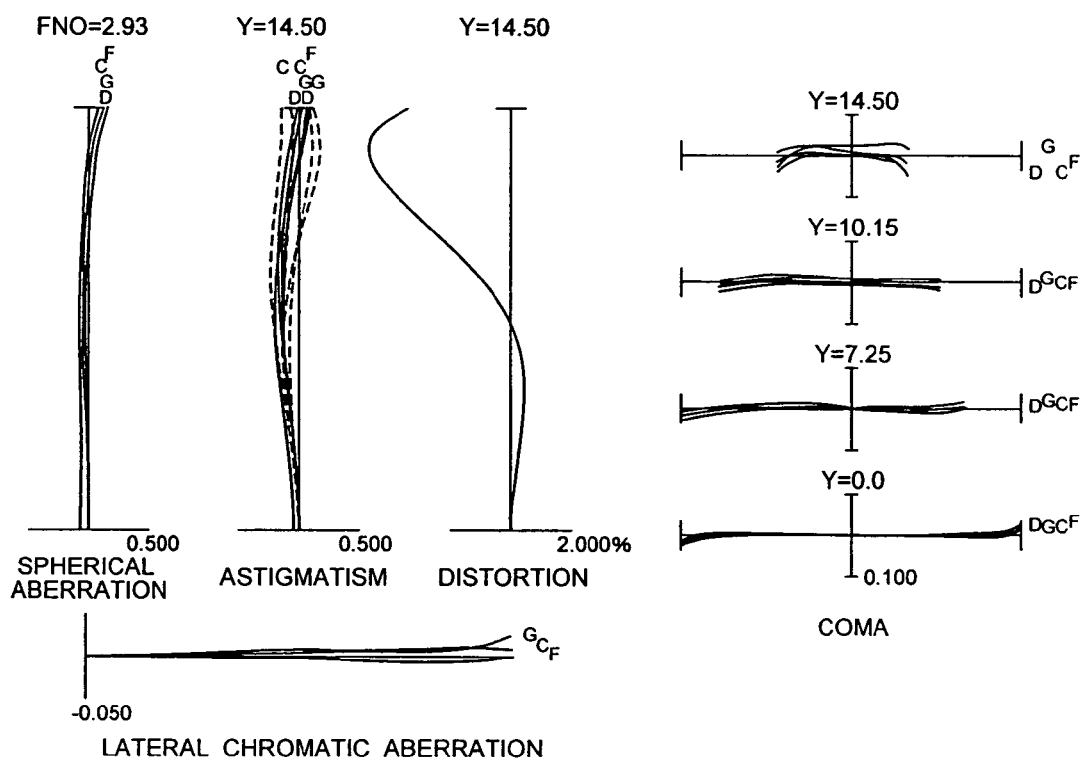
FIGS. 13A and 13B show various aberrations of the super wide-angle lens system according to Example 6 of the second embodiment upon focusing at infinity, and at shooting magnification of $-1/40$, respectively.
Figure 13B:
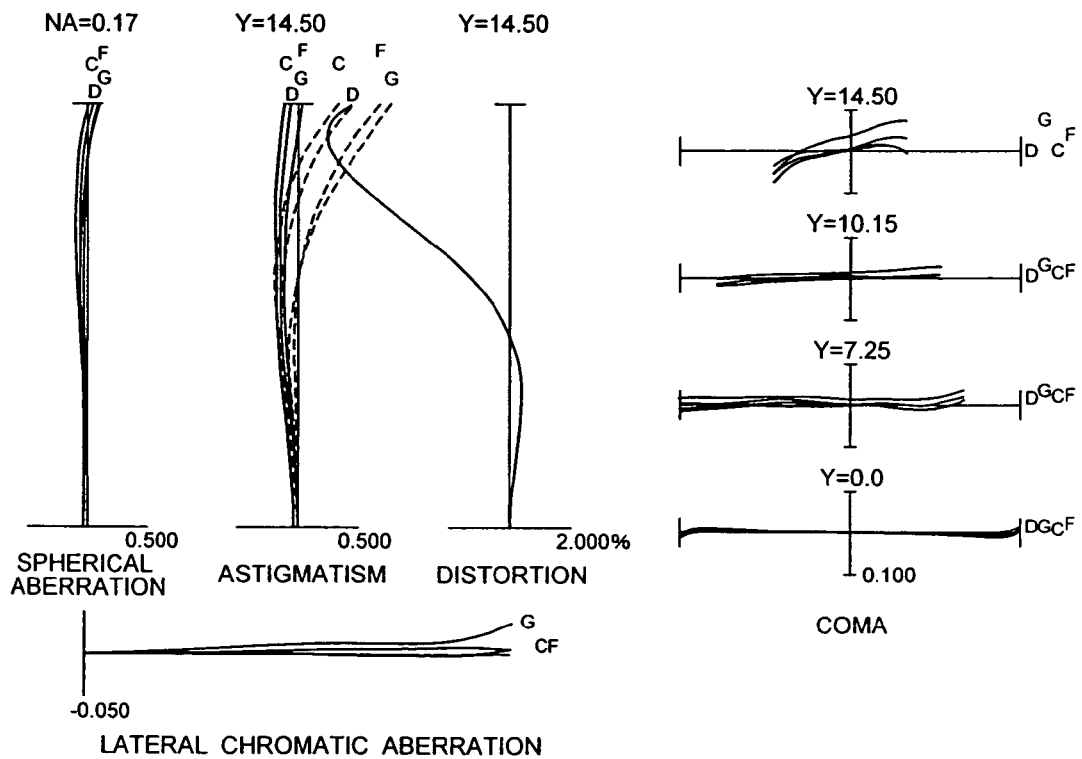

FIGS. 13A and 13B show various aberrations of the super wide-angle lens system according to Example 6 of the second embodiment upon focusing at infinity, and at shooting magnification of −1/40, respectively.

As is apparent from respective graphs, the super wide-angle lens system according to Example 6 of the second embodiment shows superb optical performance correcting various aberrations upon focusing at infinity as well as satisfactorily correcting close-range aberration fluctuation at shooting magnification of −1/40.

EXAMPLE 7

Figure 14:
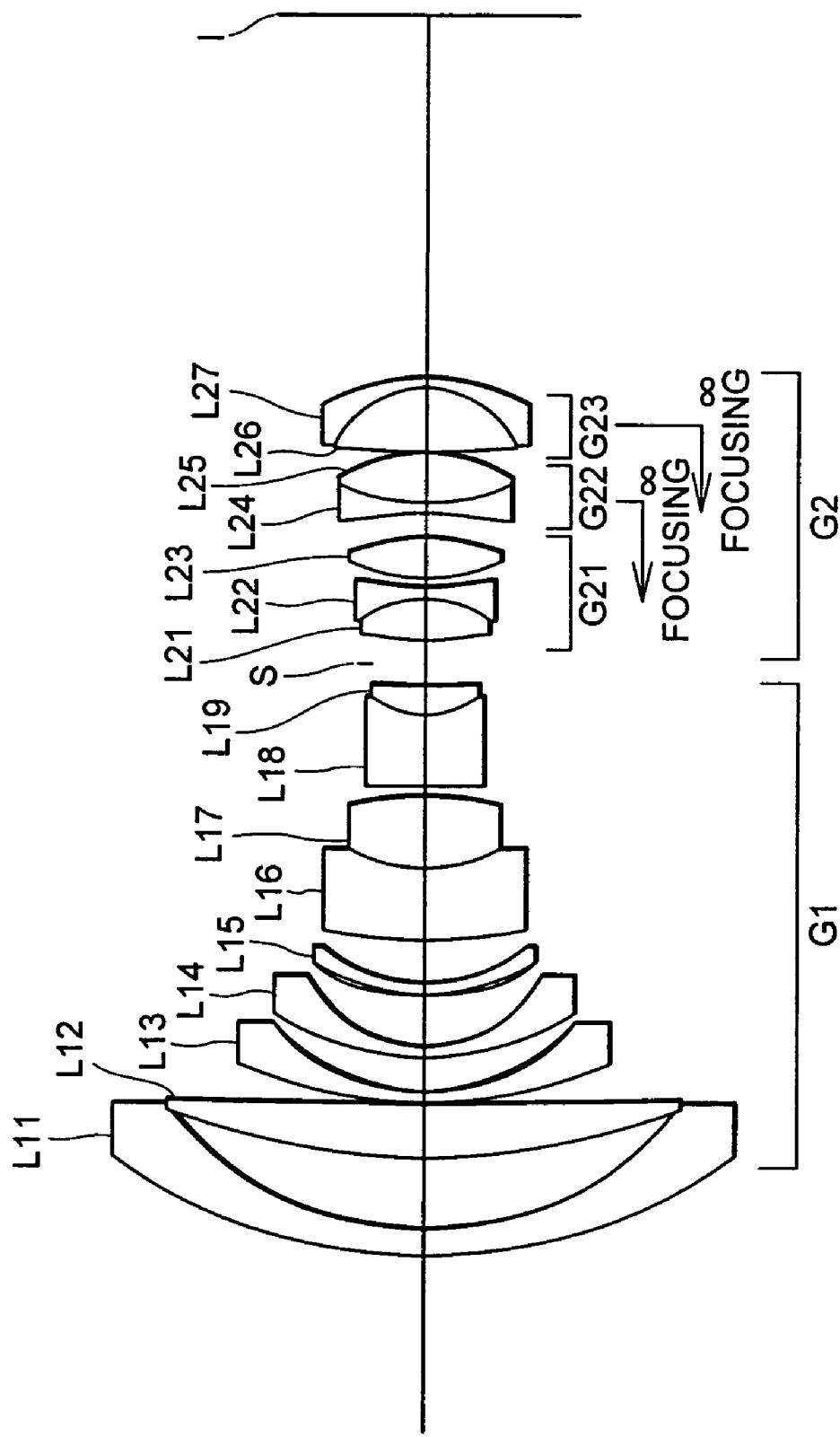
FIG. 14 is a diagram showing a sectional view of a super wide-angle lens system according to Example 7 of the second embodiment of the present invention together with trajectories of focusing lens groups.

FIG. 14 is a diagram showing a sectional view of a super wide-angle lens system according to Example 7 of the second embodiment of the present invention together with a trajectory of a focusing lens group.

As shown is FIG. 14, the super wide-angle lens system according to Example 7 of the second embodiment of the present invention is composed of, in order from an object, a first lens group G1 having negative refractive power, an aperture stop S, and a second lens group G2 having positive refractive power.

The first lens group G1 is composed of, in order from the object, a negative meniscus lens (a first negative meniscus lens) L11 having a convex surface facing to the object, a positive meniscus lens L12 having a convex surface facing to the object, a negative meniscus lens (a second negative meniscus lens) L13 having a convex surface facing to the object and an aspherical surface facing to the image with negative refractive power getting weaker on the periphery than the central portion, a negative meniscus lens L14 having a convex surface facing to the object, a negative meniscus lens L15 having a convex surface facing to the object and an aspherical surface facing to the object, a cemented lens constructed by a negative meniscus lens L16 having a convex surface facing to the object cemented with a double convex positive lens L17, and a cemented lens constructed by a negative meniscus lens L18 having a convex surface facing to the object cemented with a positive meniscus lens L19 having a convex surface facing to the object.

The second lens group G2 is composed of, in order from the object, a 2-1 lens group G21 having positive refractive power, a 2-2 lens group G22 having weak negative refractive power, and a 2-3 lens group G23 having positive refractive power.

The 2-1 lens group G21 is composed of, in order from the object, a cemented lens constructed by a double convex positive lens L21 cemented with a double concave negative lens L22, and a double convex positive lens L23 having an aspherical surface facing to the object.

The 2-2 lens group G22 is composed of, in order from the object, a cemented lens constructed by a double concave negative lens L24 cemented with a double convex positive lens L25.

The 2-3 lens group G23 is composed of, in order from the object, a cemented lens constructed by a double convex positive lens L26 cemented with a negative meniscus lens L27 having a concave surface facing to the object.

In each aspherical lens, L13 or L15, a thin resin layer is formed on a spherical lens surface and an aspherical surface is formed on the outer surface of the resin layer resulting in an aspherical lens.

Each of two positive lenses L25 and L26 in the 2-2 lens group G22 and in the 2-3 lens group G23, respectively, is a low dispersion glass having Abbe number of 82.52 at d-line (λ=587.6 nm).

In the super wide-angle lens system according to Example 7 of the second embodiment, focusing from infinity to a close-range object is carried out by moving the 2-2 lens group G22 and the 2-3 lens group G23 to the object with different speeds. In Example 7, a ratio of the moving amount of the 2-3 lens group G23 to that of the 2-2 lens group G22 upon focusing is 0.6.

Various values associated with Example 7 are listed in Table 7.

TABLE 7

[Specifications]

f = 9.628 mm
2ω = 114.4°
FNO = 2.95

[Lens Data]

| surface number | r | d | ν | n |
|---|---|---|---|---|
| 1 | 58.4292 | 3.0000 | 42.71 | 1.834807 |
| 2 | 36.0000 | 7.6967 | | |
| 3 | 75.1398 | 5.9012 | 38.03 | 1.603420 |
| 4 | 601.4064 | 0.2000 | | |
| 5 | 50.6865 | 1.2000 | 42.71 | 1.834807 |
| 6 | 22.2573 | 0.0300 | 38.09 | 1.553890 |
| 7* | 16.0000 | 3.7432 | | |
| 8 | 30.2496 | 1.2000 | 46.57 | 1.804000 |
| 9 | 14.0919 | 5.6545 | | |
| 10* | 26.0274 | 0.0300 | 38.09 | 1.553890 |
| 11 | 21.9587 | 1.2000 | 46.57 | 1.804000 |
| 12 | 17.2090 | 4.8526 | | |
| 13 | 63.1242 | 7.9000 | 42.71 | 1.834807 |
| 14 | 16.2777 | 7.9000 | 40.75 | 1.581439 |
| 15 | −33.9387 | 1.0000 | | |
| 16 | 2064.5567 | 7.9000 | 42.71 | 1.834807 |
| 17 | 9.3971 | 3.2400 | 31.07 | 1.688931 |

TABLE 7-continued

| | | | | |
|---|---|---|---|---|
| 18 | 99.6249 | 2.5000 | | |
| 19 | ∞ | 2.5000 | Aperture Stop S | |
| 20 | 32.8606 | 4.6032 | 30.13 | 1.698947 |
| 21 | −11.8057 | 1.2622 | 42.71 | 1.834807 |
| 22 | 33.6284 | 1.0000 | | |
| 23* | 19.1849 | 4.5441 | 59.37 | 1.583126 |
| 24 | −21.3033 | (D24) | | |
| 25 | −48.2311 | 1.2000 | 34.97 | 1.800999 |
| 26 | 21.4610 | 5.4940 | 82.52 | 1.497820 |
| 27 | −18.7540 | (D27) | | |
| 28 | 139.9642 | 7.1163 | 82.52 | 1.497820 |
| 29 | −10.9318 | 1.2000 | 34.97 | 1.800999 |
| 30 | −21.8963 | (B.f.) | | |

[Aspherical Data]

Surface Number 7

κ = 0.5976
C3 = 1.2583E−04
C4 = −8.3647E−05
C5 = −9.9926E−07
C6 = 3.3825E−07
C8 = −1.0738E−09
C10 = 2.0744E−12
C12 = −4.7611E−16

Surface Number 10

κ = −20.8868
C3 = 1.6188E−04
C4 = 8.6571E−05
C5 = −4.3923E−06
C6 = 1.2587E−07
C8 = 7.2683E−10
C10 = 3.0768E−12
C12 = 1.9553E−14

Surface Number 23

κ = 0.9254
C3 = −5.7983E−05
C4 = −1.3631E−06
C5 = −8.3413E−07
C6 = −1.1313E−07
C8 = 1.9868E−09
C10 = −2.0715E−11
C12 = 7.0028E−14

[Variable Distances upon Focusing]

| f or β | 9.62842 | −0.02500 |
|---|---|---|
| R | ∞ | 496.05261 |
| D0 | ∞ | 359.6926 |
| D24 | 2.59194 | 1.88841 |
| D27 | 0.20000 | 0.48141 |
| B.f. | 39.50005 | 39.92217 |

[Values for Conditional Expressions]

(5) f1/f = −0.868
(6) f2/f = 3.237
(7) R1/f = 6.054
(8) R2/f = 3.739
(9) R3/f = 7.804
(10) ΣD/f = 3.050
(11) νP = 82.52
(16) A = 0.600

Figure 15A:
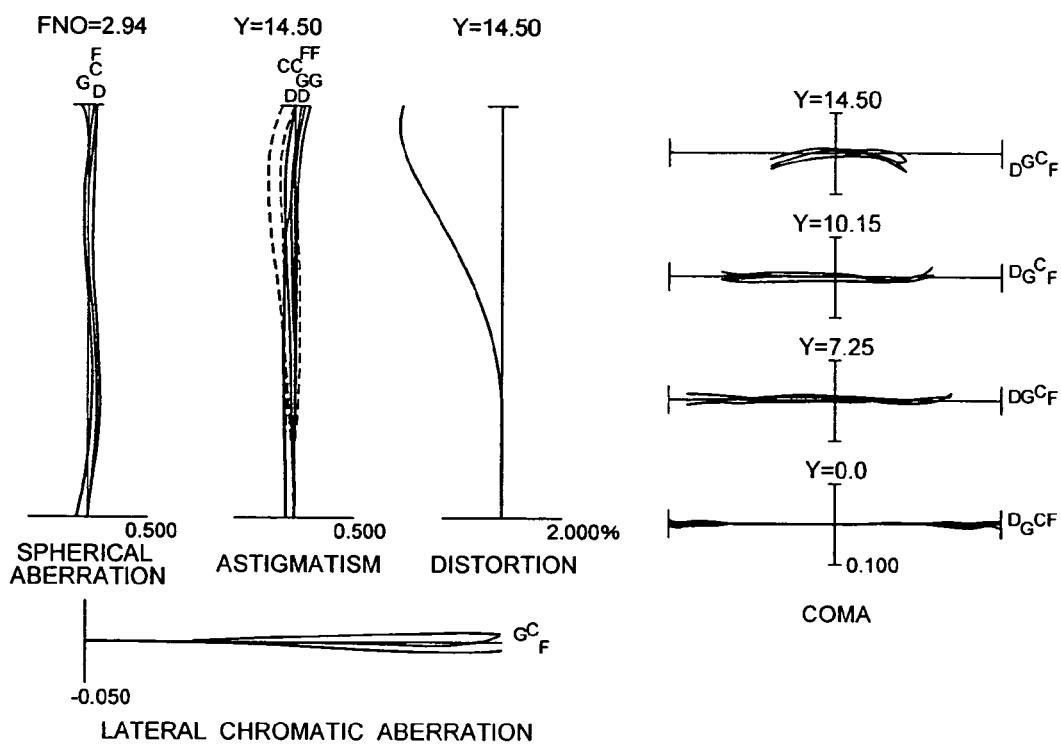
FIGS. 15A and 15B show various aberrations of the super wide-angle lens system according to Example 7 of the second embodiment upon focusing at infinity, and at shooting magnification of $-1/40$, respectively.
Figure 15B:
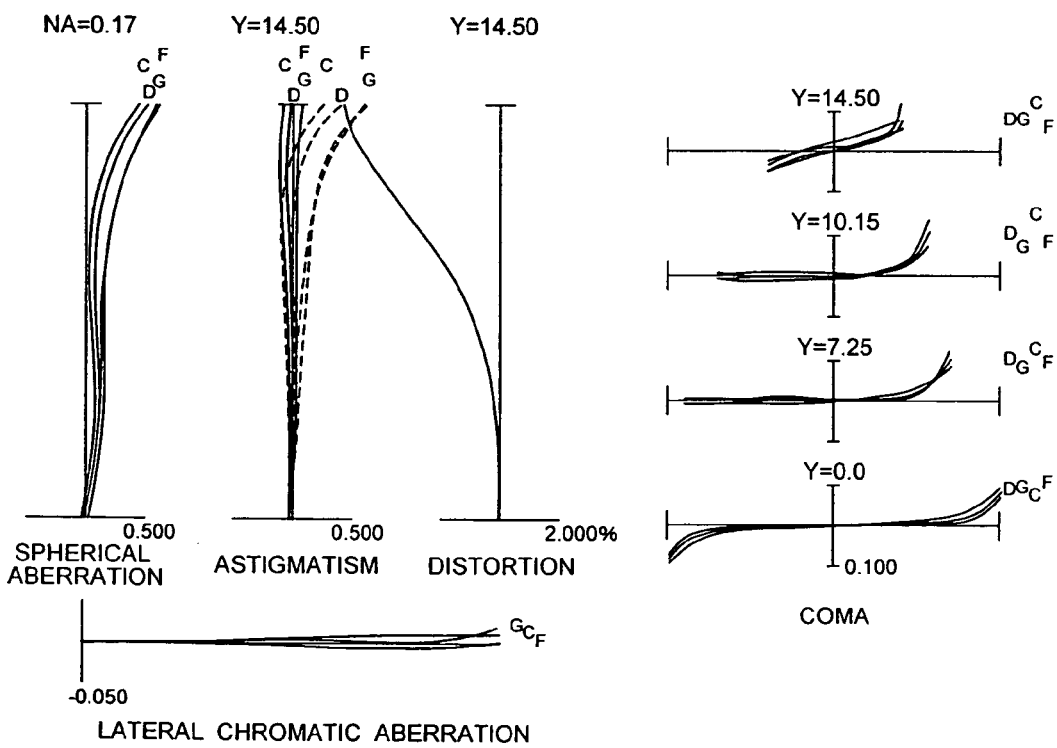

FIGS. 15A and 15B show various aberrations of the super wide-angle lens system according to Example 7 of the second embodiment upon focusing at infinity, and at shooting magnification of −1/40, respectively.

As is apparent from respective graphs, the super wide-angle lens system according to Example 7 of the second embodiment shows superb optical performance correcting various aberrations upon focusing at infinity as well as satisfactorily correcting close-range aberration fluctuation at shooting magnification of −1/40.

EXAMPLE 8

Figure 16:
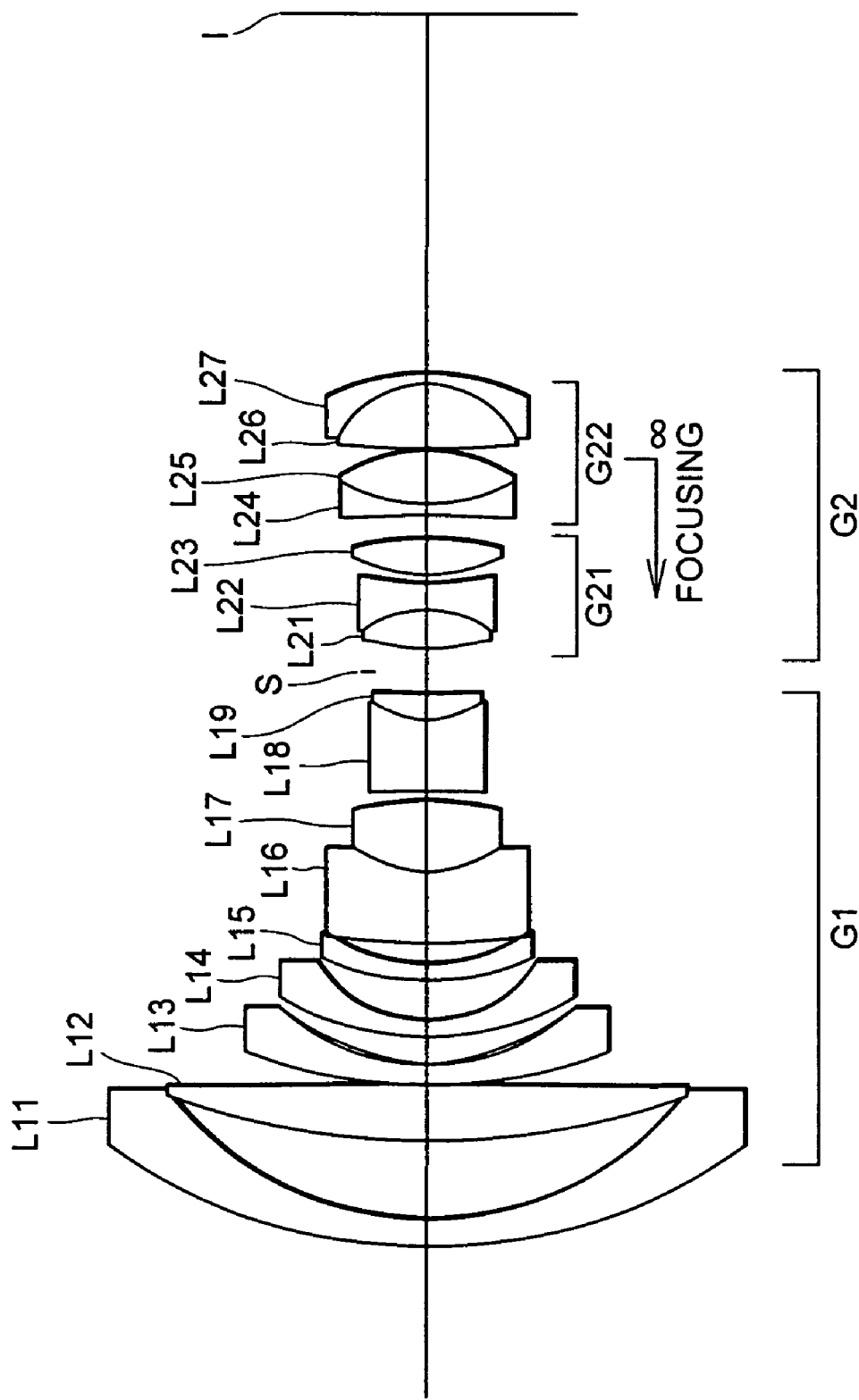
FIG. 16 is a diagram showing a sectional view of a super wide-angle lens system according to Example 8 of the second embodiment of the present invention together with a trajectory of a focusing lens group.

FIG. 16 is a diagram showing a sectional view of a super wide-angle lens system according to Example 8 of the second embodiment of the present invention together with a trajectory of a focusing lens group.

As shown is FIG. 16, the super wide-angle lens system according to Example 8 of the second embodiment of the present invention is composed of, in order from an object, a first lens group G1 having negative refractive power, an aperture stop S, and a second lens group G2 having positive refractive power.

The first lens group G1 is composed of, in order from the object, a negative meniscus lens (a first negative meniscus lens) L11 having a convex surface facing to the object, a double convex positive lens L12 having a convex surface with larger curvature facing to the object, a negative meniscus lens (a second negative meniscus lens) L13 having a convex surface facing to the object and an aspherical surface facing to the image with negative refractive power getting weaker on the periphery than the central portion, a negative meniscus lens L14 having a convex surface facing to the object, a negative meniscus lens L15 having a convex surface facing to the object and an aspherical surface facing to the object, a cemented lens constructed by a negative meniscus lens L16 having a convex surface facing to the object cemented with a double convex positive lens L17, and a cemented lens constructed by a double concave negative lens L18 cemented with a positive meniscus lens L19 having a convex surface facing to the object.

The second lens group G2 is composed of, in order from the object, a 2-1 lens group G21 having positive refractive power, and a 2-2 lens group G22 having positive refractive power.

The 2-1 lens group G21 is composed of, in order from the object, a cemented lens constructed by a double convex positive lens L21 cemented with a double concave negative lens L22, and a double convex positive lens L23 having an aspherical surface facing to the object.

The 2-2 lens group G22 is composed of, in order from the object, a cemented lens constructed by a double concave negative lens L24 cemented with a double convex positive lens L25, and a cemented lens constructed by a double convex positive lens L26 cemented with a negative meniscus lens L27 having a concave surface facing to the object.

In each aspherical lens, L13, L15, or L23, a thin resin layer is formed on a spherical lens surface and an aspherical surface is formed on the outer surface of the resin layer resulting in an aspherical lens.

Each of two positive lenses L25 and L26 in the 2-2 lens group G22 is a low dispersion glass having Abbe number of 82.52 at d-line ($\lambda$=587.6 nm).

In the super wide-angle lens system according to Example 8 of the second embodiment, focusing from infinity to a close-range object is carried out by moving only the 2-2 lens group G22 to the object.

Various values associated with Example 8 are listed in Table 8.

TABLE 8

[Specifications]

f = 9.567 mm
2ω = 114.8°
FNO = 2.90

TABLE 8-continued

[Lens Data]

| surface number | r | d | ν | n |
|---|---|---|---|---|
| 1 | 60.2661 | 3.0000 | 42.72 | 1.834807 |
| 2 | 36.0000 | 8.8000 | | |
| 3 | 83.8526 | 6.1778 | 38.03 | 1.603420 |
| 4 | −1743.6769 | 0.2000 | | |
| 5 | 62.2757 | 2.0000 | 42.72 | 1.834807 |
| 6 | 24.7178 | 0.0300 | 38.09 | 1.553890 |
| 7* | 16.0000 | 3.0000 | | |
| 8 | 32.0080 | 1.8000 | 46.57 | 1.804000 |
| 9 | 14.4893 | 4.5658 | | 1.000000 |
| 10* | 28.5432 | 0.0300 | 38.09 | 1.553890 |
| 11 | 30.0496 | 1.8000 | 46.57 | 1.804000 |
| 12 | 19.9120 | 2.3084 | | |
| 13 | 85.2909 | 7.9000 | 42.72 | 1.834807 |
| 14 | 14.3748 | 7.7710 | 40.75 | 1.581439 |
| 15 | −29.9543 | 1.0000 | | |
| 16 | −124.0020 | 7.9000 | 42.72 | 1.834807 |
| 17 | 10.4109 | 2.9009 | 31.07 | 1.688931 |
| 18 | 107.6002 | 2.5000 | | |
| 19 | ∞ | 2.5000 | Aperture Stop S | |
| 20 | 25.4917 | 4.2387 | 30.13 | 1.698947 |
| 21 | −13.1233 | 2.9254 | 42.72 | 1.834807 |
| 22 | 30.3460 | 1.0000 | | |
| 23* | 18.6462 | 0.1000 | 38.09 | 1.553890 |
| 24 | 18.7816 | 3.9274 | 59.38 | 1.583130 |
| 25 | −34.1660 | (D25) | | |
| 26 | −146.3255 | 1.2000 | 34.97 | 1.800999 |
| 27 | 21.8526 | 5.9159 | 82.52 | 1.497820 |
| 28 | −17.9639 | 0.2000 | | |
| 29 | 94.0076 | 7.1721 | 82.52 | 1.497820 |
| 30 | −11.2149 | 1.2000 | 34.97 | 1.800999 |
| 31 | −26.0232 | (B.f.) | | |

[Aspherical Data]

Surface Number 7

κ = 0.5846
C3 = −3.3743E−04
C4 = −5.5904E−05
C5 = −9.1178E−07
C6 = 2.5516E−07
C8 = −1.0582E−09
C10 = 2.5841E−12
C12 = −1.1711E−15

Surface Number 10

κ = −97.0000
C3 = 1.0204E−03
C4 = 1.8608E−05
C5 = −6.8053E−06
C6 = 1.0391E−07
C8 = 1.5151E−09
C10 = 7.5178E−12
C12 = −1.8108E−14

Surface Number 23

κ = 0.8611
C3 = −6.2430E−05
C4 = −4.5806E−06
C5 = −8.1856E−07
C6 = −6.5984E−08
C8 = 1.9593E−09
C10 = −2.1539E−11
C12 = 7.6069E−14

[Variable Distances upon Focusing]

| f or β | 9.56691 | −0.02500 |
|---|---|---|
| R | ∞ | 493.96041 |
| D0 | ∞ | 357.8430 |
| d25 | 2.59195 | 2.34205 |
| B.f. | 39.46205 | 39.71195 |

TABLE 8-continued

[Values for Conditional Expressions]

(5) f1/f = −0.756
(6) f2/f = 2.366
(7) R1/f = 6.299
(8) R2/f = 3.763
(9) R3/f = 8.765
(10) ΣD/f = 3.146
(11) νP = 82.52
(12) f21/f22 = 0.562
(13) M22 = 0.209

Figure 17A:
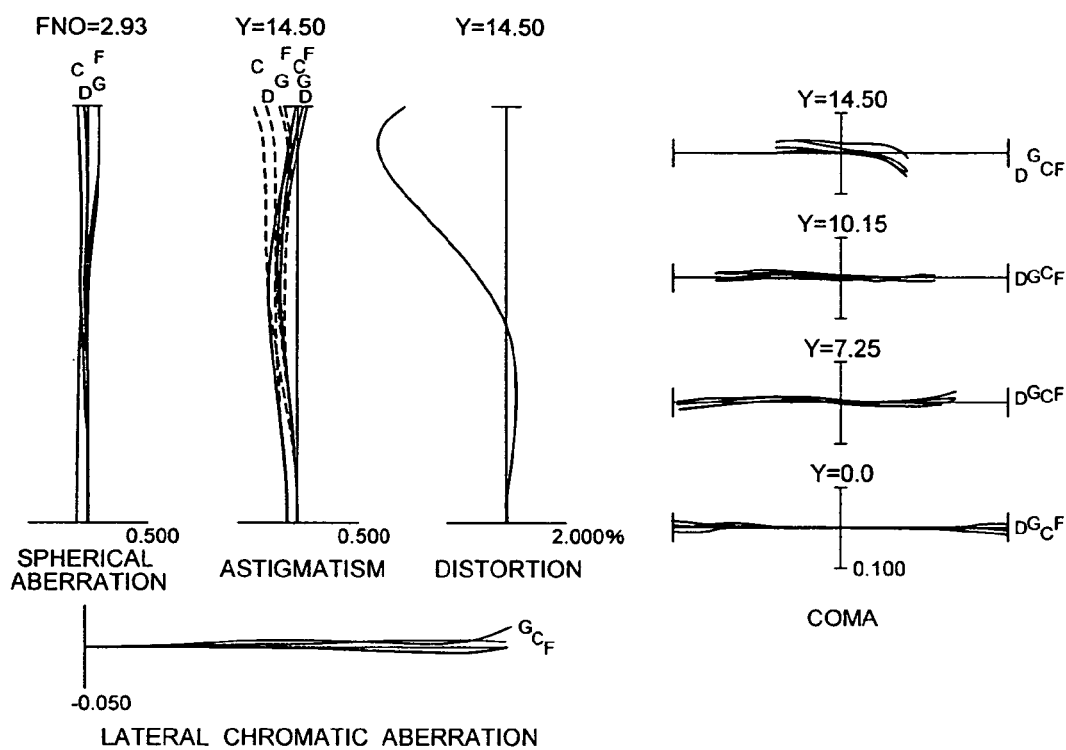
FIGS. 17A and 17B show various aberrations of the super wide-angle lens system according to Example 8 of the second embodiment upon focusing at infinity, and at shooting magnification of $-1/40$, respectively.
Figure 17B:
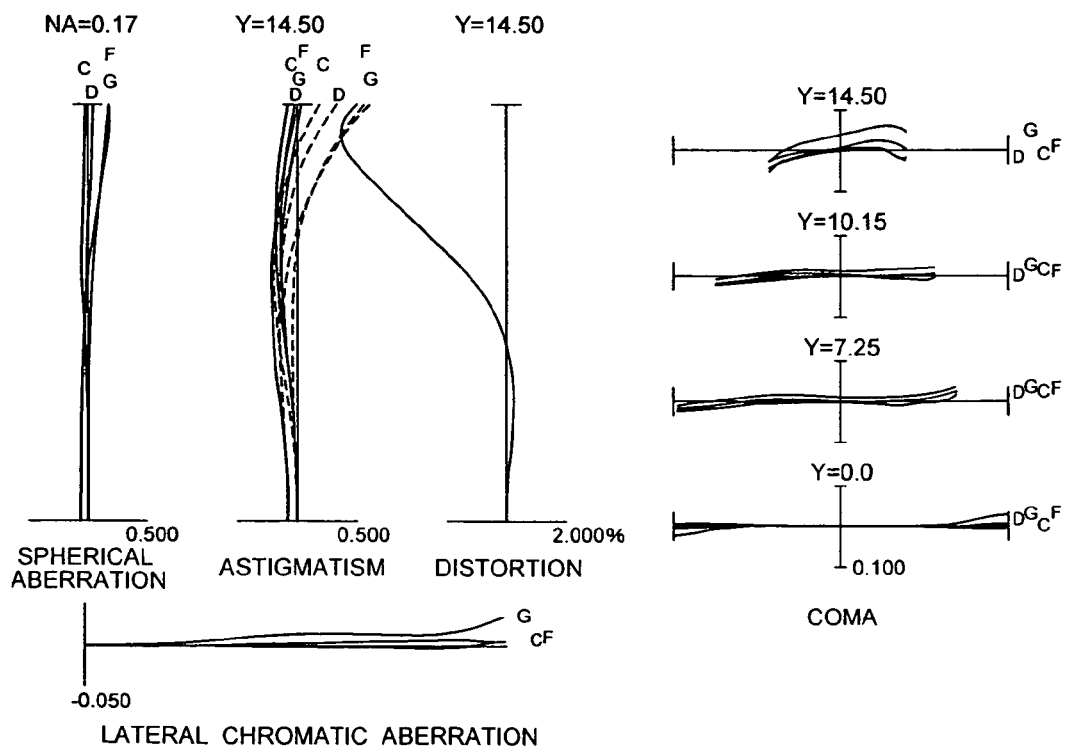

FIGS. 17A and 17B show various aberrations of the super wide-angle lens system according to Example 8 of the second embodiment upon focusing at infinity, and at shooting magnification of −1/40, respectively.

As is apparent from respective graphs, the super wide-angle lens system according to Example 8 of the second embodiment shows superb optical performance correcting various aberrations upon focusing at infinity as well as satisfactorily correcting close-range aberration fluctuation at shooting magnification of −1/40.

As described above, the present invention makes it possible to provide a fast super wide-angle lens system having the f-number of f/2.8 and a wide angle of view of 2ω=100° or more in an imaging area of a digital camera suitable for a single-lens-reflex camera using silver-halide film or a solid-state imaging device with a back focal length of 3.5 times or more of the focal length with superb optical performance. The present invention also makes it possible to provide an image-capturing device equipped with the super wide-angle lens system.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A fixed focal length super wide-angle lens system with an angle of view of 100° or more, comprising, in order from an object:
 a first lens group having negative refractive power;
 an aperture stop; and
 a second lens group having positive refractive power,
 wherein the first lens group includes at least one aspherical lens having negative refractive power, and
 the following conditional expression being satisfied:

$$-5.0 < f1/f < -0.5$$

where f denotes the focal length of the super wide-angle lens system, and f1 denotes the focal length of the first lens group.

2. The super wide-angle lens system according to claim 1, wherein the second lens group includes, in order from the object, a front lens group and a rear lens group, and the following conditional expression is satisfied:

$$0.2 < f2/fr \leq 1.0$$

where f2 denotes the focal length of the second lens group, and fr denotes the focal length of the rear lens group.

3. The super wide-angle lens system according to claim 2, wherein the following conditional expression is satisfied:

$$0.04 < f/TL < 0.12$$

where f denotes the focal length of the super wide-angle lens system, and TL denotes the distance along the optical axis between the most object side lens surface and the image plane of the super wide-angle lens system.

4. The super wide-angle lens system according to claim 1, wherein the following conditional expression is satisfied:

$$0.04 < f/TL < 0.12$$

where f denotes the focal length of the super wide-angle lens system, and TL denotes the distance along the optical axis between the most object side lens surface and the image plane of the super wide-angle lens system.

5. The super wide-angle lens system according to claim 1, wherein the following conditional expression is satisfied:

$$0.0 < [(dm-d0)/hm]/[(d30-d0)/h30] < 3.0$$

where d0 denotes the center thickness of the aspherical lens along the optical axis, dm denotes the thickness of the aspherical lens parallel to the optical axis at the height of the maximum effective aperture on the image side surface, d30 denotes the thickness of the aspherical lens parallel to the optical axis at the height of 30% of the maximum effective aperture on the image side surface, hm denotes the maximum effective radius of the aspherical lens on the image side surface, and h30 denotes the 30% of the maximum effective radius of the aspherical lens on the image side surface.

6. The super wide-angle lens system according to claim 1, wherein the first lens group includes, in order from the object, a first negative lens, a second negative lens, and a third negative lens.

7. An image capturing device using the super wide-angle lens system according to claim 1.

8. The super wide-angle lens system according to claim 1, wherein the first lens group comprises two aspherical lenses.

9. A method for forming an image of an object, comprising steps of:
 providing a fixed focal length super wide-angle lens system having an angle of view of 100° or more and including, in order from an object, a first lens group having negative refractive power, an aperture stop, and a second lens group having positive refractive power, wherein the first lens group includes at least one aspherical lens having negative refractive power, and wherein the following conditional expression is satisfied:

$$-5.0 < f1/f < -0.5$$

where f denotes the focal length of the super wide-angle lens system, and f1 denotes the focal length of the first lens group; and
 forming the image of the object using the super wide-angle lens system.

10. The method according to claim 9, wherein the second lens group includes, in order from the object, a front lens group and a rear lens group, and the following conditional expression is satisfied:

$$0.2 < f2/fr \leq 1.0$$

where f2 denotes the focal length of the second lens group, and fr denotes the focal length of the rear lens group.

11. The method according to claim 9, wherein the following conditional expression is satisfied:

$$0.04 < f/TL < 0.12$$

where f denotes the focal length of the super wide-angle lens system, and TL denotes the distance along the optical axis between the most object side lens surface and the image plane of the super wide-angle lens system.

12. The method according to claim 9, wherein the following conditional expression is satisfied:

$$0.0 < [(dm-d0)/hm]/[(d30-d0)/h30] < 3.0$$

where d0 denotes the center thickness of the aspherical lens along the optical axis, dm denotes the thickness of the aspherical lens parallel to the optical axis at the height of the maximum effective aperture on the image side surface, d30 denotes the thickness of the aspherical lens parallel to the optical axis at the height of 30% of the maximum effective aperture on the image side surface, hm denotes the maximum effective radius of the aspherical lens on the image side surface, and h30 denotes the 30% of the maximum effective radius of the aspherical lens on the image side surface.

13. The method according to claim 9, wherein the first lens group includes, in order from the object, a first negative lens, a second negative lens, and a third negative lens.

* * * * *

UNITED STATES PATENT AND TRADEMARK OFFICE
CERTIFICATE OF CORRECTION

| | | |
|---|---|---|
| PATENT NO. | : 7,239,456 B2 | Page 1 of 1 |
| APPLICATION NO. | : 11/092919 | |
| DATED | : July 3, 2007 | |
| INVENTOR(S) | : Yoko Kimura and Haruo Sato | |

It is certified that error appears in the above-identified patent and that said Letters Patent is hereby corrected as shown below:

On the title page, the inventorship information should read: --Yoko Kimura, Ayase (JP); Haruo Sato, Kawaguchi (JP)--.

Signed and Sealed this

Sixth Day of May, 2008

JON W. DUDAS
*Director of the United States Patent and Trademark Office*